United States Patent [19]
Kashida et al.

[11] Patent Number: 5,481,518
[45] Date of Patent: Jan. 2, 1996

[54] MULTICHANNEL DIGITAL-SIGNAL REPRODUCING APPARATUS FOR SWITCHING ACCESS TIMING RELATIVE TO REPRODUCING TIMING

[75] Inventors: Motokazu Kashida, Musashino; Hidenori Hoshi, Yokohama; Kenichi Nagasawa, Kawasaki; Shinichi Yamashita, Yokohama, all of Japan

[73] Assignee: Canon Kabushiki Kaisha, Tokyo, Japan

[21] Appl. No.: 307,047

[22] Filed: Sep. 16, 1994

Related U.S. Application Data

[63] Continuation of Ser. No. 27,583, Mar. 5, 1993, abandoned, which is a continuation of Ser. No. 369,690, Jun. 21, 1989, abandoned.

[30] Foreign Application Priority Data

Jun. 28, 1988  [JP]  Japan ................................. 63-159926
Sep. 14, 1988  [JP]  Japan ................................. 63-230921

[51] Int. Cl.⁶ ................................................. G11B 20/10
[52] U.S. Cl. ..................... 369/53; 360/32; 360/36.2; 360/39; 360/51; 360/64; 369/48
[58] Field of Search ........................... 360/9.1, 23, 32, 360/33.1, 36.2, 39, 51–52, 64; 358/335, 339; 369/48, 53, 59, 124

[56] References Cited

U.S. PATENT DOCUMENTS

| | | | |
|---|---|---|---|
| 4,316,223 | 2/1982 | Baldwin et al. | 360/39 |
| 4,516,164 | 5/1985 | Moxon | 360/39 X |
| 4,636,877 | 1/1987 | Ido | 360/23 X |
| 4,672,480 | 6/1987 | Yamamoto | 360/39 X |
| 4,862,292 | 8/1989 | Enari et al. | 360/32 X |
| 4,897,739 | 1/1990 | Hasegawa et al. | 360/23 X |
| 4,947,271 | 8/1990 | Nakayama et al. | 360/32 X |
| 4,953,866 | 10/1990 | Duncan | 360/32 X |
| 4,956,725 | 11/1990 | Kozuki et al. | 360/32 X |
| 5,019,914 | 5/1991 | Dropsy | 360/32 X |

*Primary Examiner*—W. R. Young
*Attorney, Agent, or Firm*—Fitzpatrick, Cella, Harper & Scinto

[57] ABSTRACT

An apparatus for reproducing digital information from a recording medium having a plurality of parallel tracks and digital information recorded thereon as n-channel (n being an integer greater than or equal to 2) digital signals. The n-channel digital signals are reproduced by n-reproducing heads. The digital information contained in the reproduced signals is stored in a storage device. Discriminating data is obtained for determining which of the n-channel digital signals reproduced correspond to the reproducing heads. The timing of an access device, accessing the storage device for performing a predetermined processing of the digital signals stored in the storage device relative to the reproducing timing of the digital information reproduced by the n reproducing heads, is controlled in accordance with the discrimination data.

5 Claims, 18 Drawing Sheets

FIG. 16

| A - 1 | B - 1 | C - 1 |
| A - 2 | B - 2 | C - 2 |
| A - 3 | B - 3 | C - 3 |
| A - 4 | B - 4 | C - 4 |
| A - 5 | B - 5 | C - 5 |
| A - 6 | B - 6 | C - 6 |
| A - 7 | B - 7 | C - 7 |
| A - 8 | B - 8 | C - 8 |

MULTICHANNEL DIGITAL-SIGNAL REPRODUCING APPARATUS FOR SWITCHING ACCESS TIMING RELATIVE TO REPRODUCING TIMING

This application is a continuation of prior application, Ser. No. 08/027,583 filed Mar. 5, 1993, which application is a continuation of prior application, Ser. No. 07/369,690 filed Jun. 21, 1989, both now abandoned.

BACKGROUND OF THE INVENTION

1. Field of the Invention

This invention relates to a digital-signal reproducing apparatus, and more particularly, to an apparatus for reproducing digital signals from a recording medium in which n-channel (n being an integer greater than or equal to 2) digital signals are recorded on a plurality of parallel tracks.

2. Description of the Prior Art

An example of a multitrack digital-signal reproducing apparatus is a digital video tape recorder (termed hereinafter DVTR). In the present specification, an explanation will be provided illustrating the DVTR.

In general, video signals have a wide band. Hence, the amount of data per unit time of the digital video signals in which video signals are digitized is large, and it is difficult to serially perform magnetic recording and reproduction of the digital video signals. Consequently, it has been considered to provide such digital video signals in multiple channels, and decrease the data rate of each channel. In a DVTR, it is usual to perform multichannel recording and reproduction.

When the entire digital signal processing in a DVTR is performed in time series, a part of an image is completely lost due to the generation of burst, errors caused by damage in a tape, loading of a magnetic head and the like. Therefore, it becomes difficult to perform correction by interpolation and the like, causing an unfavorable result. Furthermore, since the majority of a data matrix (ECC block) to which an error correcting code (ECC) is added is erroneous, the entire ECC block provides erroneous data even if a code having a high error correction capability is added, and so it is very ineffective.

In general, therefore, in a DVTR, recording and reproduction are performed under a state in which an ECC block is divided into plural sections which are dispersed relative to time series. At this time, it is also devised such that orders of data of each picture element on a picture surface are changed in time series, and an excellent interpolation can be performed even when error correction is impossible. In such a DVTR, processings, such as encoding and decoding of an ECC, arrangement and conversion of data and the like, are performed so as to be completed making video signals for a predetermined time interval a unit. In a DVTR in which multichannel recording and reproduction are performed, the above-described processings are completed forming video signals recorded on tracks the number of which is an integer multiple of the number n of multiple channels into a unit. This prevents indefinite signal processing while reproducing, In a DVTR, it is typical to set the rotation frequency of rotating heads to an integer ratio relative to the frame frequency of the video signals. This is advantageous in that the configuration of servo-system circuits, processing circuits of video signals and the like are simplified.

Accordingly, in a multichannel DVTR, in general, video signals for one frame are recorded on (n×j) tracks (n is the number of multiple channels, and j is an integer no smaller than 1), and the above-described processings are completed forming video signals recorded on (n×i) tracks (i is an integer no smaller than 1) into a unit.

FIG. 1 is a diagram showing a head configuration of a multitrack DVTR. In FIG. 1, eight rotating heads HI–H8 are disposed on a rotating drum 1. The rotating heads H1–H4, and the rotating heads H5–H8 are adjacently disposed, respectively. The heads H1–H4 are also disposed so that they simultaneously trace on a magnetic tape. Heads H5–H8 are similarly disposed to simultaneously trace a magnetic tape. The rotating heads H5–H8 are rotated having a 180° phase difference relative to the rotating heads H1–H4. The heads HI–H4 and the heads H5–H8 alternately trace a magnetic tape which is wound around the drum 1 over an angle range of no smaller than 180° to perform four-channel recording.

FIG. 2 shows a track pattern recorded on a magnetic tape T by the heads shown in FIG. 1. Tracks indicated by Tr1–Tr8 show tracks recorded by the heads H1–H8, respectively. By tracing the heads H1–H4 from positions shown by reference characters H1–H4 in an obliquely upward direction in FIG. 2, four-channel recording is performed while forming the tracks Tr1–Tr4. Four-channel reproduction is also performed by tracing the tracks Tr1–Tr4. The heads HI, H3, H5 and H? have an identical azimuth angle, and the heads H2, H4, H6 and H8 also have an identical azimuth angle which is different from that of the heads HI, H3, H5 and H7. A so-called azimuth recording is thereby performed.

In the DVTR of the present example, the number of rotations of the drum 1 is 1800 rpm, and the video signals for one frame are recorded on eight tracks. The above-described signal processing is completed for the eight tracks, that is, the video signals for one frame. Since the frame frequency thereby coincides with the rotation frequency of the drum 1, and signal processing is performed for one-frame unit, it is possible to commonly control the timing of each unit, and thus a DVTR having a simple circuit configuration can be realized.

In the above-illustrated DVTR, signal processing while reproduction is performed forms reproduced signals of the heads H1–H4 and succeeding reproduced signals of the heads H5–H8 into a unit. Accordingly, the heads H1–H8 necessarily trace the tracks TP1–Tr8 respectively, while reproducing. Although it is possible to reproduce signals even when, for example, the heads H1–H4 are tracing the tracks Tr3–Tr6 having an identical azimuth angle (shown by HI'–ZH4' in FIG. 2), or the tracks Tr5–Tr8 (shown by HI" –H4" in FIG. 2), it is impossible to return to original video signals since signal processing is performed, as described above, forming reproduced signals of the heads H1 –H4 and succeeding reproduced signals of the heads H5–H8 into a unit.

Hence, in this kind of DVTR, tracking control has heretofore been performed so that the head H1 necessarily traces the track Tr1. However, since a track as a control target for the head H1 exists only once per eight tracks, a tracking error of ±4 tracks is generated. Consequently, when tracking control is disrupted immediately after starting of the apparatus or for some other reason, a very long period is required before a tracking-control draw-in state is obtained. During this period, reproduced video signals cannot be obtained. Accordingly, video signals are not reproduced for a long period at the start of an apparatus or when tracking is disrupted, and so a reproduced picture is very unsightly.

Furthermore, a pattern of recorded signals for tracking control must be of an eight-track period, and so circuits for tracking in both recording and reproducing systems inevitably become complicated. In addition, in an apparatus in which a pilot signal is recorded on a part of a track, and tracking control is performed using the pilot signal, not only does the circuit become complicated, but also the pilot signal requires a large recording area. These facts hinder a high-density recording.

Such problems increase in accordance with an increase in the number of multiple channels and an increase in the number of tracks in which signal processing is completed. These will become greater obstacles when an attempt is further made to perform high-density recording of wideband signals.

SUMMARY OF THE INVENTION

It is an object of the present invention to solve the problems described above.

It is another object of the present invention to provide a multichannel digital-signal reproducing apparatus which can have a quick tracking-control draw-in time and which is extremely useful when applied to a system in which digital signals having an extremely high data rate are recorded and reproduced in a high density.

These and other objects are accomplished, according to one aspect of the present invention, by an apparatus for reproducing digital information from a recording medium having a plurality of parallel tracks and digital information recorded thereon as n-channel (n being an integer greater than or equal to 2) digital signals, the apparatus includes:

(a) n reproducing heads for reproducing the n-channel digital signals;

(b) storage means for storing digital information within the digital signals which the n reproducing heads reproduce;

(c) access means for accessing the storage means in order to perform a predetermined processing for the digital information stored in the storage means;

(d) discrimination means for discriminating to which of the n-channel digital signals the reproduced signals of the n reproduced heads correspond, and outputting discrimination data; and (e) control means for relatively switching an access timing of the access means to the storage means relative to a reproducing timing of the digital information by the n reproducing heads according to the discrimination data.

According to another aspect, the present invention relates to an apparatus for reproducing digital information from a recording medium having a plurality of parallel tracks and digital information recorded thereon as n-channel (n being an integer greater than or equal to 2) digital signals, the apparatus includes:

(a) n reproducing heads for reproducing the n-channel digital signals;

(b) storage means fop storing digital information within the digital signals which the n reproducing heads reproduce;

(c) first access means for accessing the storage means in order to perform a predetermined first processing for the digital information stored in the storage means;

(d) second access means for accessing the storage means in order to perform a predetermined second processing for the digital information stored in the storage means;

(e) comparison means for comparing write addresses of the digital information reproduced by the n reproduced heads in the storage means with access addresses to the storage means by the second access means; and (f) address shift means for shifting the access addresses to the storage means by the access means in accordance with an output of the comparison means; the address shift means shifting the access addresses to the storage means making an amount which corresponds to the digital information for n tracks one unit.

These and other objects and advantages of the present invention will become more apparent from the following detailed description of the preferred embodiments of the invention.

BRIEF DESCRIPTION OF THE DRAWINGS

FIG. 16 is a timing chart for explaining the operation of an address control circuit in FIG. 15;

DETAILED DESCRIPTION OF THE PREFERRED EMBODIMENTS

Preferred embodiments of the present invention when applied to a DVTR will be hereinafter explained in detail with reference to the drawings.

EXAMPLE 1

A first embodiment of the present invention will be hereinafter explained.

Figure 1:
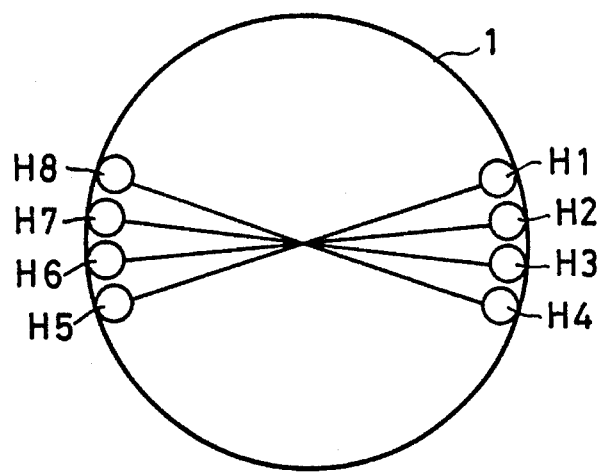
FIG. 1 is a diagram showing a head configuration of a DVTR.
Figure 2:
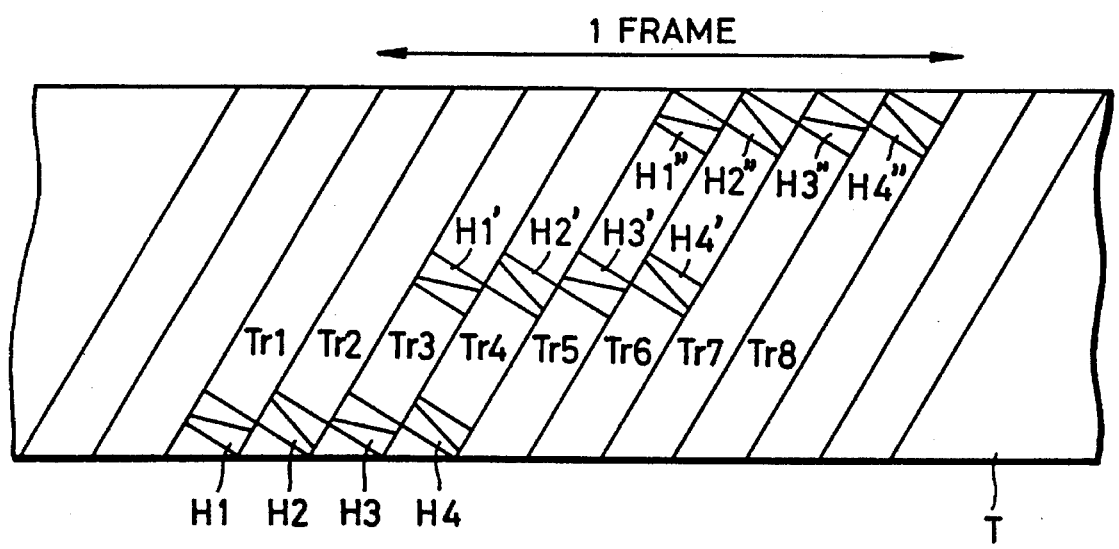
FIG. 2 is a diagram showing a recorded pattern on a tape in the DVTR having the head configuration shown in FIG. 1.
Figure 3:
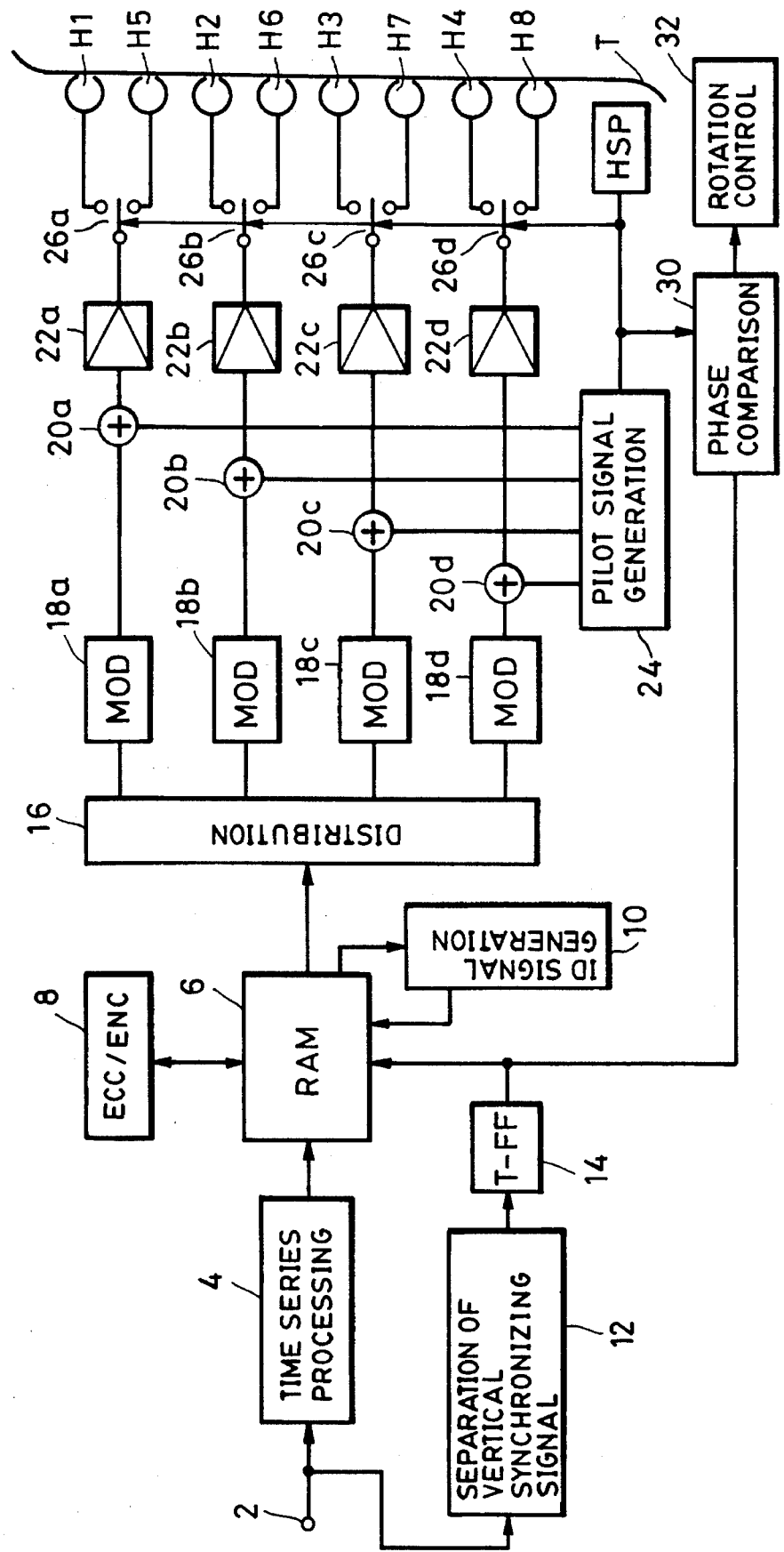
FIG. 3 is a diagram showing a schematic configuration of a recording system of a DVTR according to an embodiment of the present invention.

FIG. 3 is a diagram showing a schematic configuration of a recording system of a DVTR according to the present embodiment.

In FIG. 3, a video signal is input to a terminal 2, and the input video signal is supplied to a time-series processing circuit 4, when a signal processing, which is capable of being processed in time series, is performed after A/D conversion. For example, a relatively simple band compression, such as subsampling, DPCM and the like, and accompanying processing, such as filtering and the like, can be performed in time series without using a large memory. In the present example, an A/D converter, a two-dimensional space filter, a subsampler and a DPCM circuit are included within the processing circuit 4. A digital signal which is output from the time-series processing circuit 4 is supplied to a RAM 6.

The RAM 6 is a memory for performing a processing in which it is necessary to change data within one frame, that is, a processing which is completed in one frame. In the present example, encoding of ECC, conversion of data arrangement within a frame relative to output data and the like are performed via the RAM 6. An ECC encoder (ECC/ENC) 8 delivers to and receives from tile RAM 6 data, and an ID-signal generation circuit 10 supplies additional data (ID) to data within the RAM 6.

Access timing of data to the RAM 6 is determined by a signal having a period of one frame interval which is obtained by inputting a vertical synchronizing signal separated in a vertical-synchronizing-signal separation circuit 12 into a T flip-flop (T-FF) 14.

The processing performed in the RAM 6 in the present embodiment will be thereinafter explained with reference to FIGS. 4A, 4B, 5 and 6.

Figure 4A:
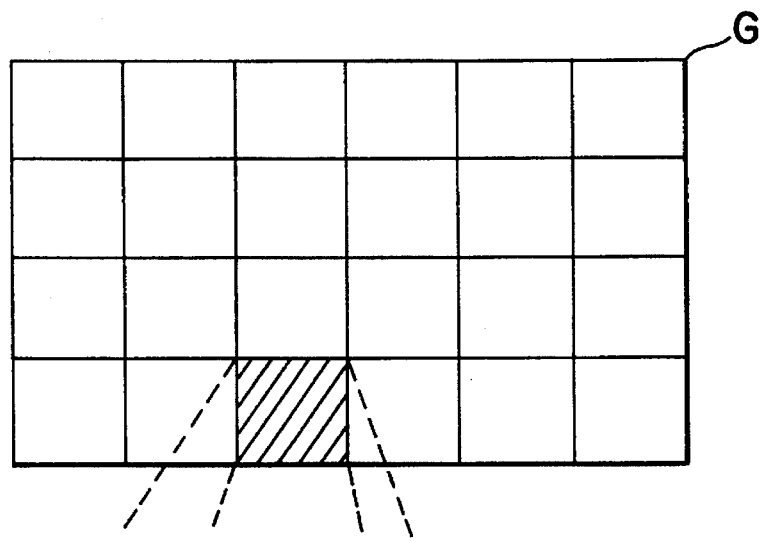
FIGS. 4A, 4B 5 and 6 are diagrams for explaining the content of data recorded by the DVTR shown in FIG. 3.
Figure 4B:
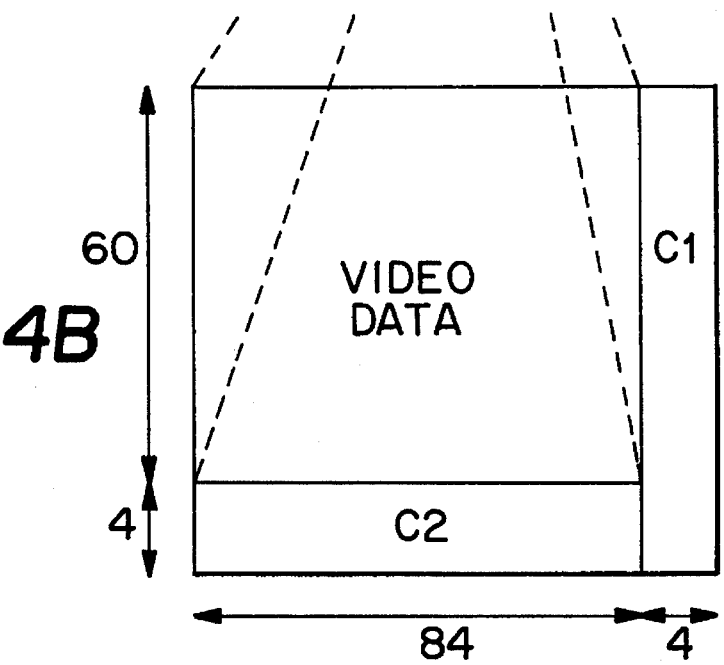

It is assumed that video data disposed within one ECC block are the amount of data corresponding to an image of an area which is obtained by dividing a picture surface G (FIG. 4A) of one frame into (4×6) as shown in FIG. 4B. The data are not simply data within one area obtained by dividing the picture surface into (4×6), but are data which are extracted from an area obtained by dividing a memory area for one frame into (4×6) after shuffling image data for one frame stored in the memory, for example, in a unit of a line, and which exist in dispersed positions in an actual picture surface.

Figure 5:
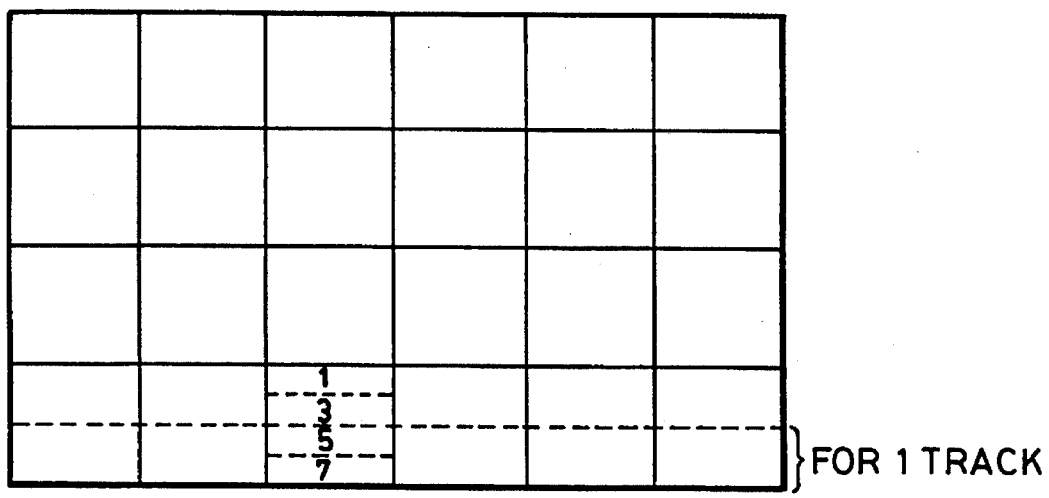

After rearranging again data for a data matrix of such video data consisting of, for example, 60 lines in the vertical direction and 84 picture elements (each picture element consists of one byte) in the horizontal direction, a four byte C2 parity and a four-byte C1 parity are added to the vertical and horizontal directions, respectively, to obtain one ECC block. In the apparatus of the present embodiment, since video signals for one frame are recorded divided on eight tracks, the number of ECC blocks per one track is three. Actually, however, (16×88) data are extracted from each of twelve ECC blocks to allocate to one track. As shown in FIG. 5, there exist four (16×88)-byte data within one ECC block, each of which is recorded on a different track. Numbers 1, 3, 5 and 7 in FIG. 5 indicate track numbers for each frame, and correspond to Tr1, Tr3, Tr5 and Tr7, respectively. In the present embodiment, ECC blocks on the right side of the picture surface are recorded on tracks having even numbers, and ECC blocks on the left side are recorded on tracks having odd numbers.

Figure 6:
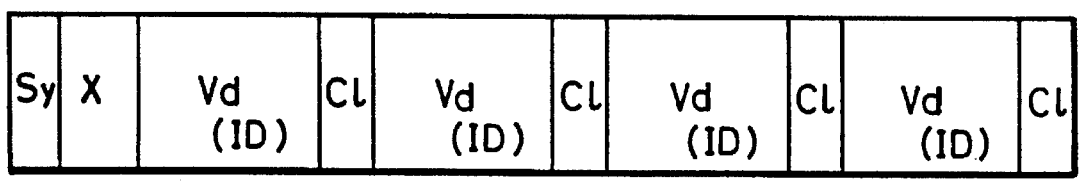

FIG. 6 shows a configurational example of sync blocks. As shown inn FIG. 6, ECC blocks for four lines are made a unit, to which sync bits (Sy) of about one byte and data (X) of about three bytes including the numbers of the sync blocks and redundant bits thereof are added to provide the configuration. Consequently, there exist (12×4 =) 48 sync blocks which include video data (Vd) per one track.

Again in FIG. 3, an ID-signal generation circuit 10 generates (4×88)-byte additional data per each track, and the RAM 6 forms one sync block for ID per each track. The ID data include data indicating track numbers (Tr1–Tr8) within each frame other than well-known time codes, cuing information and the like.

Data which are output from the RAM 6 are distributed into four channels in a distribution circuit 16 according to a rule as described above, and modulated in digital modulation circuits 18a, 18b, 18c and 18d, respectively. Modulated signals are mixed in adders 20a, 20b, 20c and 20d with a pilot signal for tracking control from a pilot-signal generation circuit 24 which will be described later, and the resultant signals are further supplied to switching circuits 26a, 26b, 26c and 26d via amplifiers 22a, 22b, 22c and 22d. A lead switching pulse (HSP) generator 28 generates a one-period rectangular-wave signal (HSP) per one rotation of the drum 1 in synchronization with the rotation phase of the drum 1, and the HSP controls the switching circuits 26a, 26b, 26c and 26d. That is, when the heads H1, H2, H3 and H4 trace the tape T, the HST assumes a ligh level (Hi), and when the heads H5, H6, H7 and H8 trace the tape T, the HSP assumes a low level (Lo).

The phase of the HSP is compared with that of an output signal having a frame period of the T-FF 14 in a phase comparator 30, and a rotation control circuit 32 of the drum is controlled by an output of the phase comparator 30. The rotation phase of the drum 1 is thereby controlled so that the phase difference between output signals of the HSP and T-FF 14 becomes 0, and synchronization is achieved between the signal processing timing of the RAM 6 and the recording Liming of each head.

Figure 7:
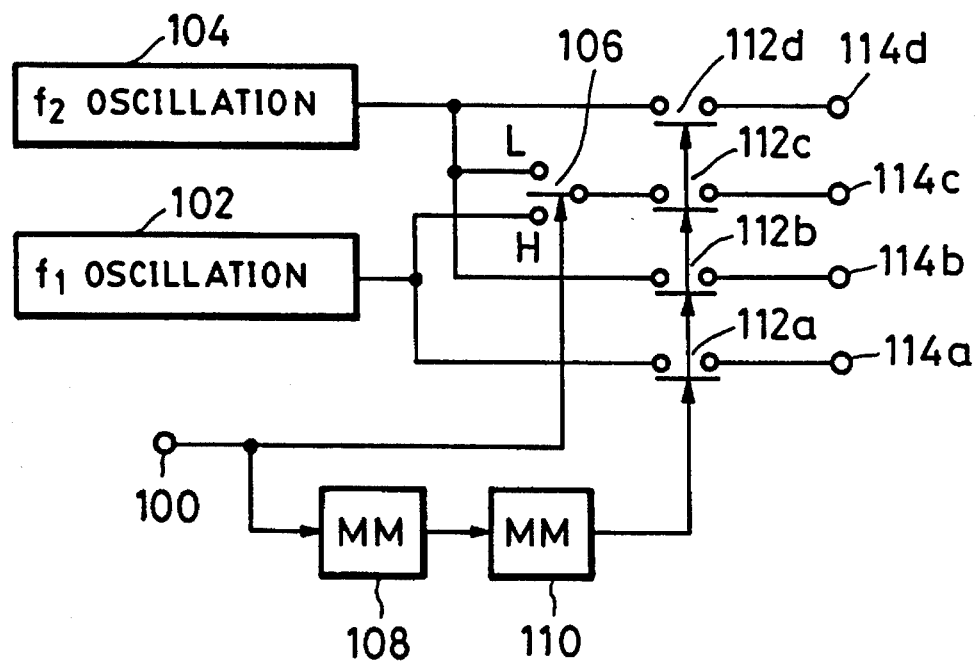
FIG. 7 is a diagram showing an example of a pilot-signal generation circuit in FIG. 3.
Figure 8:
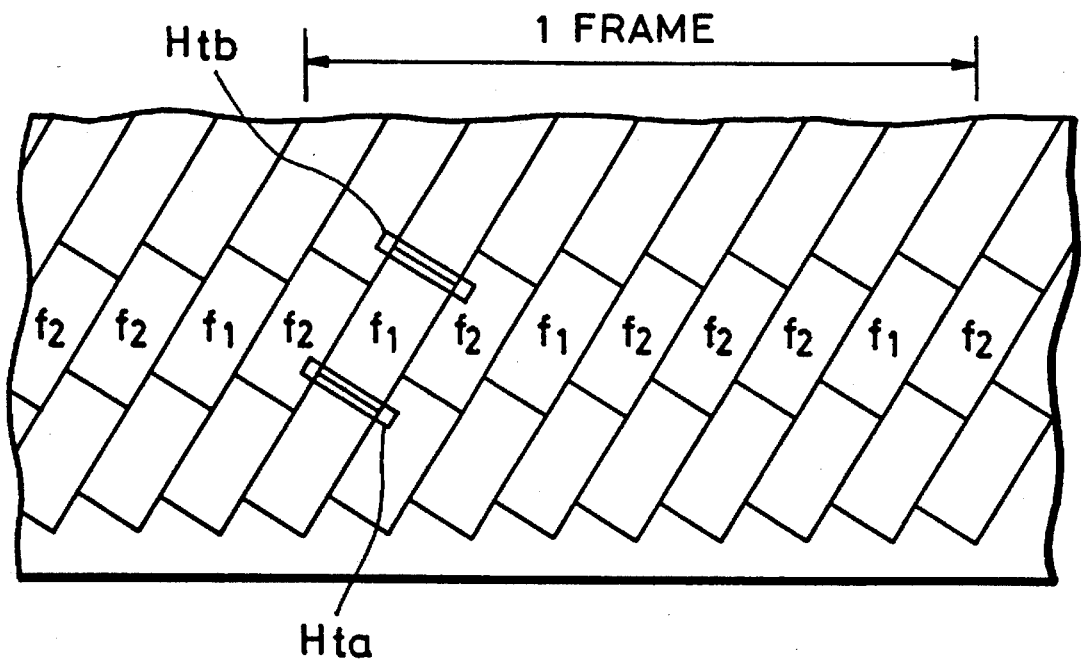
FIG. 8 is a diagram showing an arrangement of pilot signals for tracking control which are recorded on a tape by the DVTR shown in FIG. 3.

The HSP is also supplied to the pilot-signal generation circuit 24, where the generation timing of a pilot signal for tracking control is controlled. FIG. 7 is a diagram showing an example of the pilot-signal generation circuit 24. FIG. 8 is a diagram showing a recorded pattern on the tape T of pilot signals generated by the pilot-signal generation circuit 24 shown in FIG. 7.

In FIG. 7, there are shown an input terminal 100 for the HSP, an oscillator 102 for generating a signal having a frequency $f_1$ (simply termed hereinafter $f_1$) and an oscilator 104 for generating a signal having a frequency $f_2$ (simply termed hereinafter $f_2$). A switch 106 is connected to the side H when the HSP is Hi, and to the side L when the HSP is Lo, respectively, and outputs $f_1$ and $f_2$ in respective cases. Monomultivibrators (MM) 108 and 110 determine gate timings for gates 112a, 112b, 112c and 112d. The MM 108 is triggered at leading and trailing edges of the HSP, and supplies an output which is kept Hi for a predetermined period to the MM 110. The MM 110 is triggered by a trailing edge of an output of the MM 108 to obtain an output which is kept Hi for a predetermined period. Gate timing is determined by the output of the MM 110. Although, for simplifying the explanation, the heads H1–H4 and the heads H5–H8 are assumed to have an identical rotation phase and turn on the gates 112a, 112b, 112c and 112d by an identical timing, gate timings are actually shifted by the amount of a phase difference between the heads H1–H4 so that each head records a pilot signal for tracking in an identical phase.

The $f_1$ and $f_2$ gated by the gates 112a, 112b, 112c and 112d are supplied to the adders 20a, 20b, 20c and 20d via terminals 114a, 114b, 114c and 114d, and recorded on the tape as shown in FIG. 8. That is, $f_1$ and $f_2$ are recorded on identical portions of each track on tracks Tr1, Tr3 and Tr5, and Tr2, Tr4, Tr6, Tr7 and Tr8, respectively.

Figure 9:
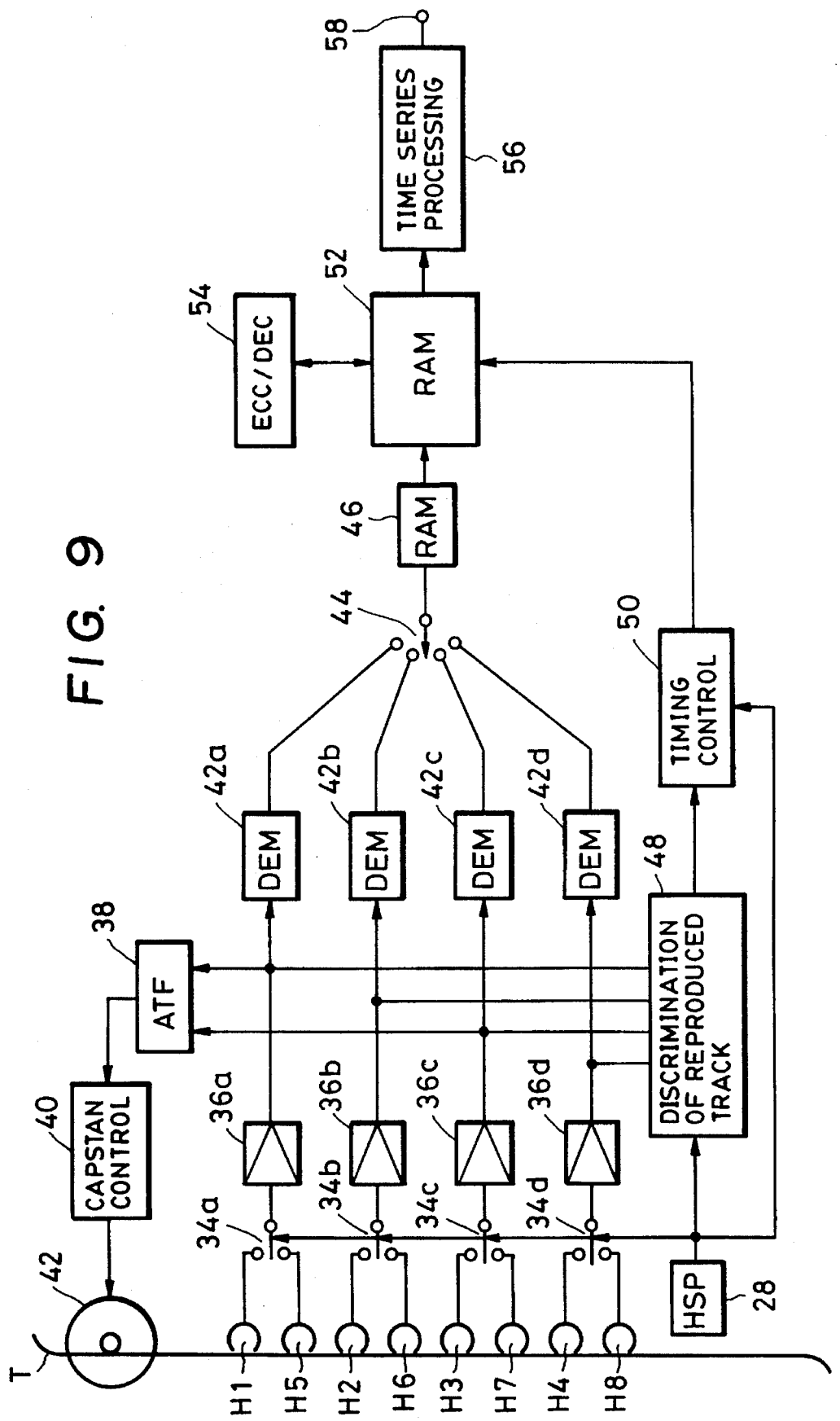
FIG. 9 is a diagram showing a schematic configuration of a reproducing system of a DVTR as a first embodiment of the present invention.

Next, a reproducing system will be explained. FIG. 9 is a diagram showing a configuration of a reproducing system as an embodiment of the present invention which corresponds to the recording system in FIG. 3.

Outputs from the heads H1–H8 are supplied to reproducing amplifiers 36a, 36b, 36c and 36d via switching circuits 34a, 34b, 34c and 34d which are controlled by the HSP, respectively. An ATF circuit 38 forms a tracking control signal according to outputs from the amplifiers 36a and 36c, and supplies it to a capstan control circuit 40. The capstan control circuit 40 controls the rotation phase of a capstan 42 in accordance with the tracking control signal so that each of the heads H1–H8 traces a track which is reproducible. In more detail, tracking control is not performed, as in the prior art, so that the head H1 necessarily traces on the track Tr1, but is performed so that the head H1 traces either of the tracks Tr1, Tr3, Tr5 and Tr7 which have identical azimuth angles.

Figure 10:
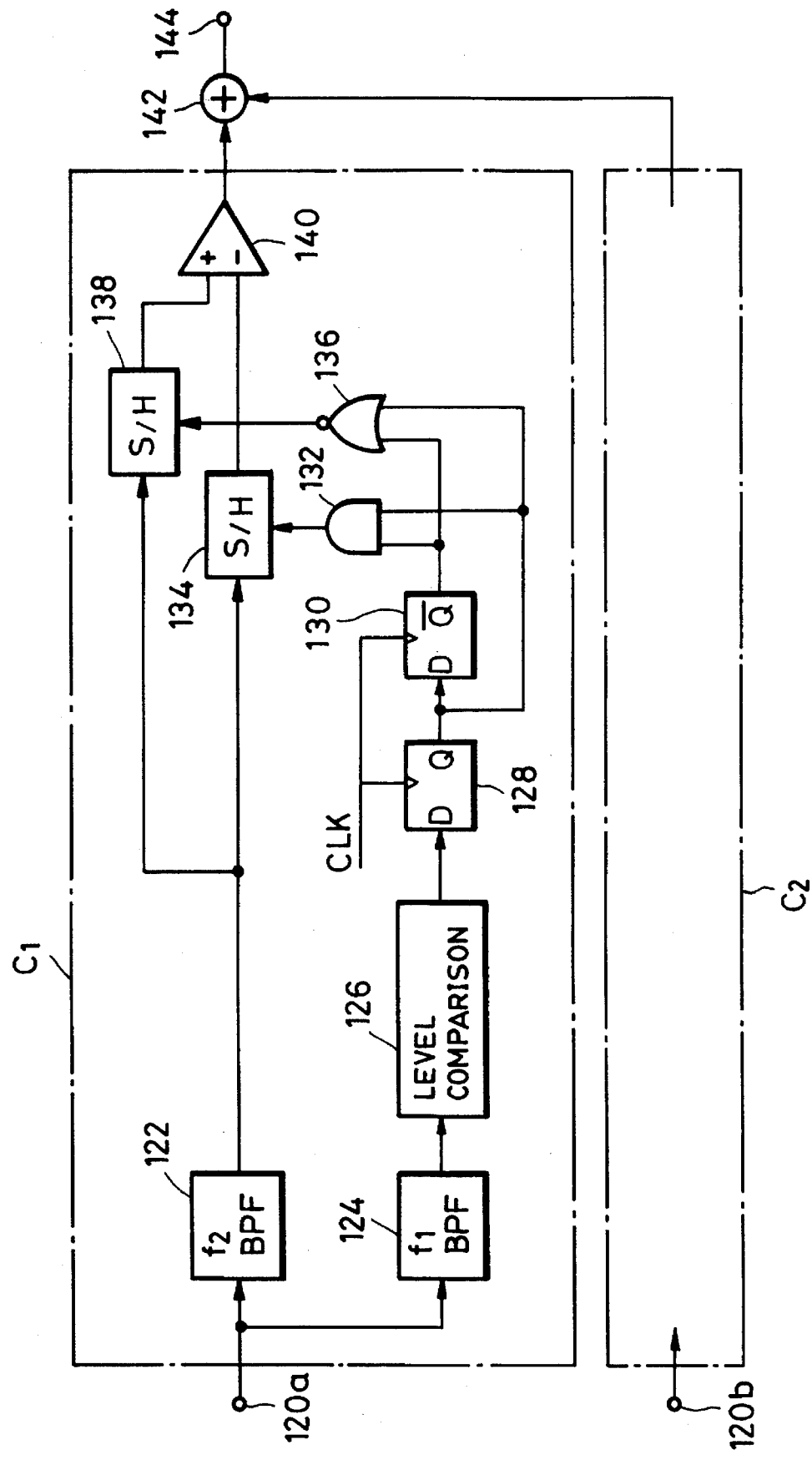
FIG. 10 is a diagram showing an example of the ATF circuit illustrated in FIG. 9.

FIG. 10 shows an example of the ATF circuit 38 illustrated in FIG. 9. In FIG. 10, outputs from the amplifiers 36a and 36c are supplied to terminals 120a and 120b, respectively, and these outputs are supplied to circuits C1 and C2. Since the circuits C1 and C2 are identically configured, only the circuit C1 will be hereinafter explained in detail.

A band-pass filter (BPF) 122 extracts $f_2$ to perform a level detection thereof, and a band-pass filter 124 extracts $f_1$ to perform a level detection thereof. If the head H1 is tracing either of the tracks Tr1, Tr3 and Tr5 while the heads H1–H4 are tracing the tape, the head H1 mainly reproduces the $f_1$. If the head H1 is tracing, for example, the track Tr3 as shown by Hta and Htb in FIG. 8, the $f_1$ is mainly reproduced from the position Hta up to the position Htb. A level comparator 126 outputs a rectangular-wave signal indicating whether or not the detection level of the $f_1$ separated in the BPF 124 is no lower than a predetermined threshold level. This signal is input to a D terminal of a D flip-flop (DFF) 128, and a Q output from the DFF 128 is further input to a D terminal of a DFF 130. The DFF's 128 and 130 are driven by a clock signal CLK which has a sufficiently high frequency. An output from the DFF 130 is delayed by one clock relative to an output from the DFF 128. Hence, by providing an AND of a Q output of the DFF 128 and a $\overline{Q}$ output of the DFF 130 by an AND gate 132, a pulse for one clock can be obtained with the timing of a leading edge of the above-described rectangular-wave signal. Similarly, by providing a NOR of a Q output from the DFF 128 and a $\overline{Q}$ output from the DFF 130 by a NOR gate 136, a pulse for one clock can be obtained with the timing of a trailing edge of the above-described rectangular-wave signal. This indicates that the AND gate 132 outputs a pulse with the timing that the head Hi reaches the position indicated by Hta in FIG. 8, and the NOR gate 136 outputs a pulse with the timing that the head HI reaches the position indicated by Htb in FIG. 8.

On the other hand, outputs from the BPF 122 are results of level detections of the $f_2$, and are subjected to sample and hold in sample-and-hold circuits (S/H) 134 and 138 which are operated by output pulses from the AND gate 132 and the NOR gate 136, respectively. This indicates that the level $f_2$ from the preceding track Tr2 which is reproduced from the head H1 in the position of Hta, and the level $f_2$ from the succeeding track Tr4 which is reproduced from the head H1 in the position of Htb (reproduced from portions indicated by oblique lines in FIG. 8, respectively) are subjected to sample and hold. By supplying outputs of the sample-and-hold circuits 134 and 138 to a differential amplifier 140, a tracking-error signal indicating how far the shifted position relative to the track Tr3 the head H1 is tracing is ouptut from the differential amplifier 140. At this time, a tracking-error signal of the head H3 relative to the track TF5 is similarly obtained from the circuit C2. A tracking control signal is obtained by adding these signals in an adder 142, and is supplied to a capstan control circuit 40 via a terminal 144.

Similarly, if the heads H1 and H5 are tracing near either of the tracks Tr1, Tr3 and Tr5, a tracking-error signal is obtained from the circuit C1, and if the heads H3 and H7 are tracing near either of the tracks Tr1, Tr3 and Tr5, a tracking-error signal is obtained from the circuit C2. If the heads H1 and ]{5 are tracing near the track Tr5, the heads H3 and H7 are tracing near the track Tr7. If the heads H3 and H7 are tracing near the track Tr1, the leads H1 and H5 are tracing near the track Tr7. When heads are tracing near the track Tr7, the f1 is not re,produced at all, and the S/H circuits 134 and 138 are not operated, but since a tracking-error signal when heads have traced near the track Tr3 immediately before the moment is held, a similar tracking-error signal is obtained. Accordingly, by operating the capstan control circuit 40 using a tracking control signal which is output from the terminal 144, the heads H1, H3, H5 and H7 are controlled so that they trace either of the tracks Tr1, Tr3, Tr5 and Tr7, respectively. Since the maximum tracking error in this case is ±1 track, a tracking-control draw-in state can be obtained very promptly.

Again in FIG. 9, outputs from the amplifiers 36a, 36b, 36c and 36d are digitally demodulated by digital demodulating circuits 42a, 42b, 42c and 42d and the demodulated signals are supplied to a switch 44. A RAM 46 is a memory capable of storing reproduced data for one frame. The connection of the switch 44 is sequentially switched for every cycle time for writing one word into the RAM 46. The cycle time of the RAM 46 in this case is set to ¼ of the transmission time of one-byte data of each channel, and outputs from the demodulating circuits 42a, 42b, 42c and 42d are virtually written in parallel into the RAM 46. A write address at this time is determined for each reproducing head, and a reproduced signal of each head is written into a predetermined address.

Figure 11:
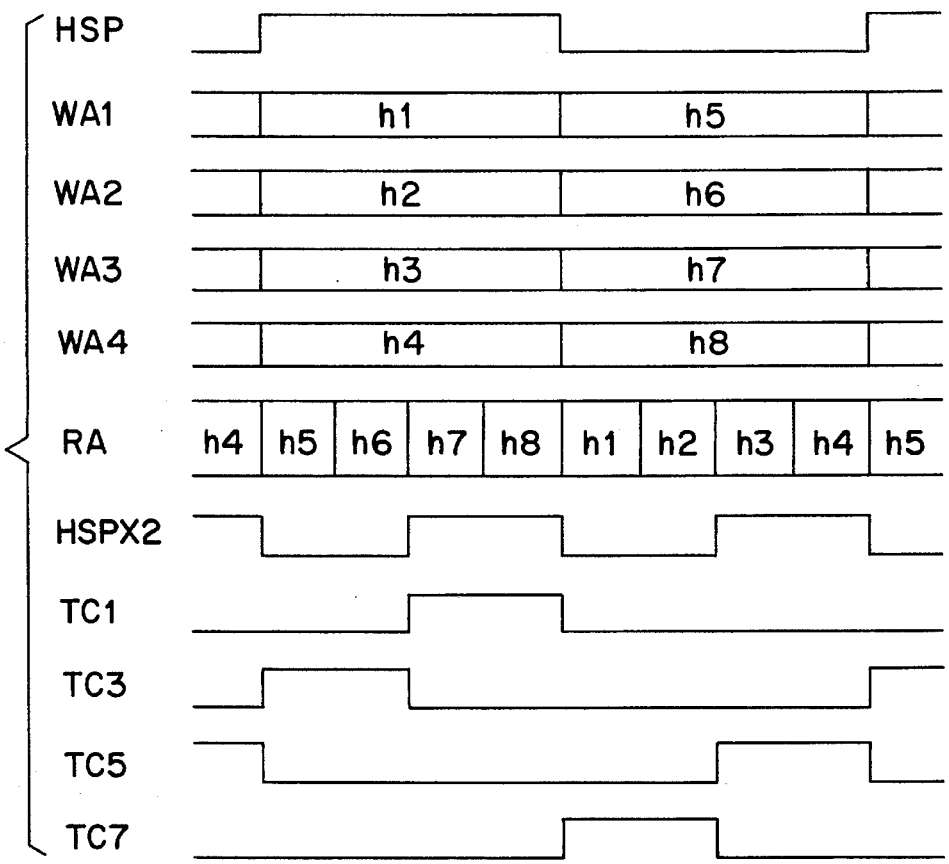
FIG. 11 is a timing chart showing operation timing for each unit in FIG. 9.

FIG. 11 is a timing chart indicating operation timing of each unit in FIG. 9. In FIG. 11, there are shown write addresses WA1, WA2, WA3 and WA4 in the RAM 46 for outputs of the demodulators 42a, 42b, 42c and 42d, respectively, and a read address RA in the RAM 46. In FIG. 11, there are also shown addresses h1–h8 indicating areas within the RAM 46 for storing data for one track which are reproduced by the heads H1–H8. As is apparent from FIG. 11, a reproduced signal from each of the heads H1–H8 is serially output from the RAM 46. A RAM 52 performs a processing which is completed in one frame, such as an ECC decoding and the like, and constitutes storage means together with the RAM 46. If the track corresponding to the data which is output from the address h1 in the RAM 46 is not specified, access timing for each address in each processing unit cannot be determined. In the present embodiment, a reproduced-track discrimination circuit 48 discriminates which of the tracks Tr1–Tr8 the heads H1–H8 are reproducing signals from, and determines output timing of a timing pulse to be supplied to the RAM 52 from a timing control circuit 50. The operations of the reproduced-track discrimination circuit 48 and the timing control circuit 50 will be hereinafter explained in detail.

Figure 12:
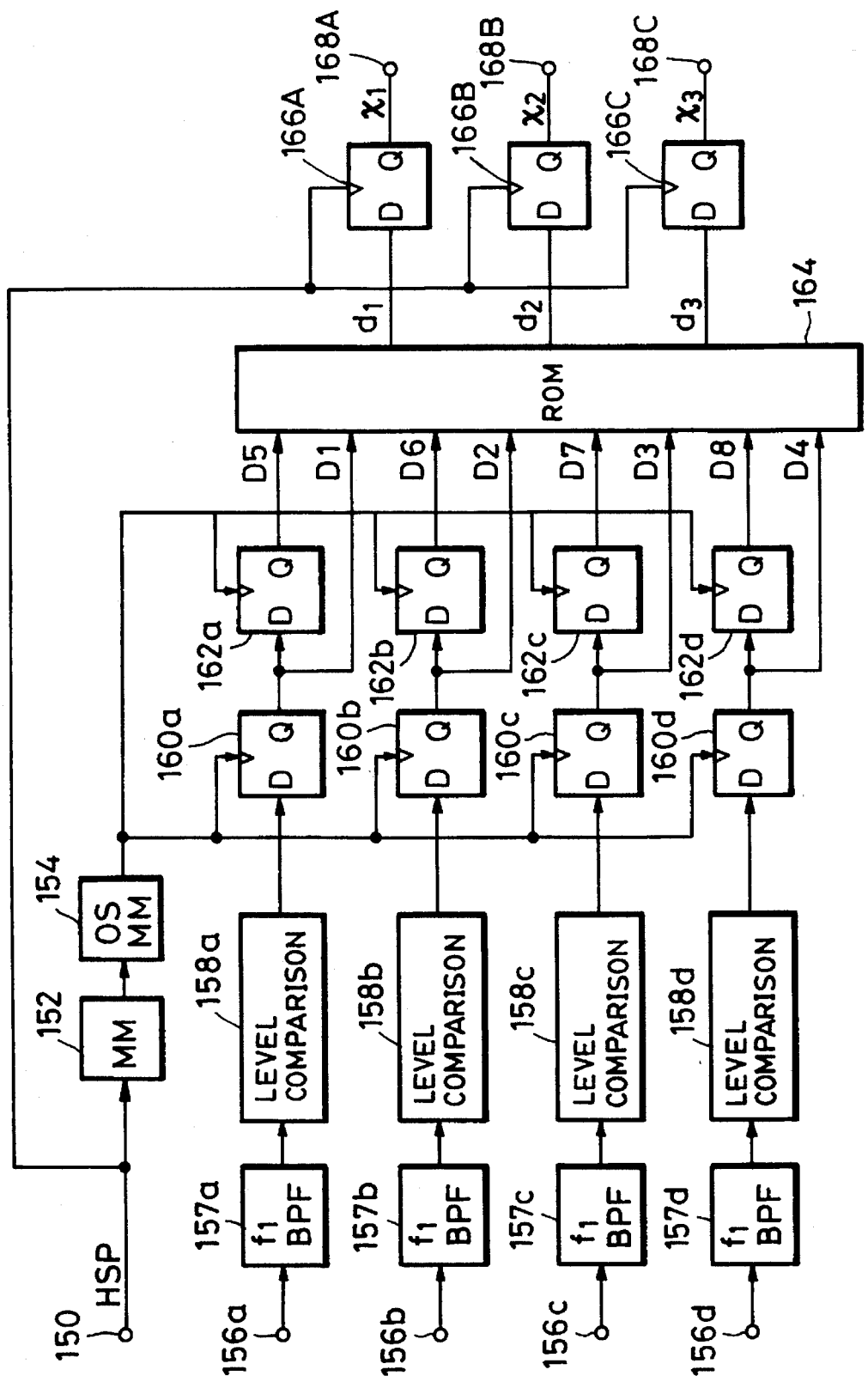
FIG. 12 is a diagram showing an example of the reproduced-track discrimination circuit depicted in FIG. 9.

FIG. 12 is a diagram showing an example of the reproduced-track discrimination circuit 48 in FIG. 9. In FIG. 12, there is shown an input terminal 150 for the HSP, and a monomultivibrator MM152 which is triggered by leading and trailing edges of the HSP. A one-shot monomultivibrator MM154 is triggered by a trailing edge of the MM152, and outputs a pulse with the timing that each of the heads H1–H8 traces an area in which a pilot signal is recorded. Consequently, the pulse has a ½ -frame period. Outputs from the amplifiers 36a–36d are input to terminals 156a–156d, respectively. Signals which are input from the terminals 156a–156d are supplied to level comparison circuits 158a–158d via BPF's 157a–157d for separating the $f_1$. Level comparison circuits 158a–158d output Hi if there exists an $f_1$ having a level no lower than a predetermined level in a reproduced signal from each channel, and output Lo if there does not exist such an $f_1$. DFF's 160a–180d latch outputs of the level comparison circuits 158a–158d at a timing in which a pilot signal is reproduced, and DFF's 162a–162d delay the outputs of the DFF's 160a–160d by a period of ½ frame.

Q outputs D1, D2, D3 and D4 of the DFF's 160a–160d and Q outputs DS, DS, D7 and D8 of the DFF's 162a–162d are supplied to a ROM 164 in parallel. The ROM 164 is configured such that it outputs the number of a track which the head H1 is tracing in three bits when the D1–D8 are assumed to correspond to outputs of the heads H1–H8. For example, when the D1, D3 and D5 are Hi and other outputs are Lo, out-puts d1, d2 and d3 are made "0, 0, 1". More specifically, in this example, the outputs for D6, DT, and D8 are indicating that heads H6, H7 and H8 are tracing tracks Tr6, Tr7 and Tr8, respectively (see FIG. 8). Accordingly, it is readily determined that head H1 is tracing track Tr1. Subsequently, the ROM 164 provides a three bit binary number "0, 0, 1" (representing the number 1 which corresponds to track Tr1) in the form of the outputs d1, d2 and d3, and when the D1, D5 and D7 are Hi and other outputs are Lo, outputs d1, d2 and d3 are made "1, 0, 1". The outputs for D2, D3 and D4 are low in this example. It is readily determined from the track arrangement depicted in FIG. 8 that heads H2, H3 and H4 are tracing tracks Tr8, Tr7 and Tr8, respectively. Accordingly, H1 is tracing track TrS. ROM 184 outputs a three bit binary number "1, 0, 1" (representing the number 5 which corresponds to track Tr5) in the form of the outputs d1, d2 and d3. The outputs d1, d2 and d3 are latched by a trailing edge of the HSP in DFF's 188A–188C, respectively, and only data when the D1–D8 correspond to outputs of the heads H1–H8 are output from terminals 188A–188C. Consequently, if a track within the frame which the head HI is tracing is Trx, three-bit data ⌈×1, ×2, ×3⌋ which are output from the terminals 168A–188C indicate the x in three bits.

Figure 13:
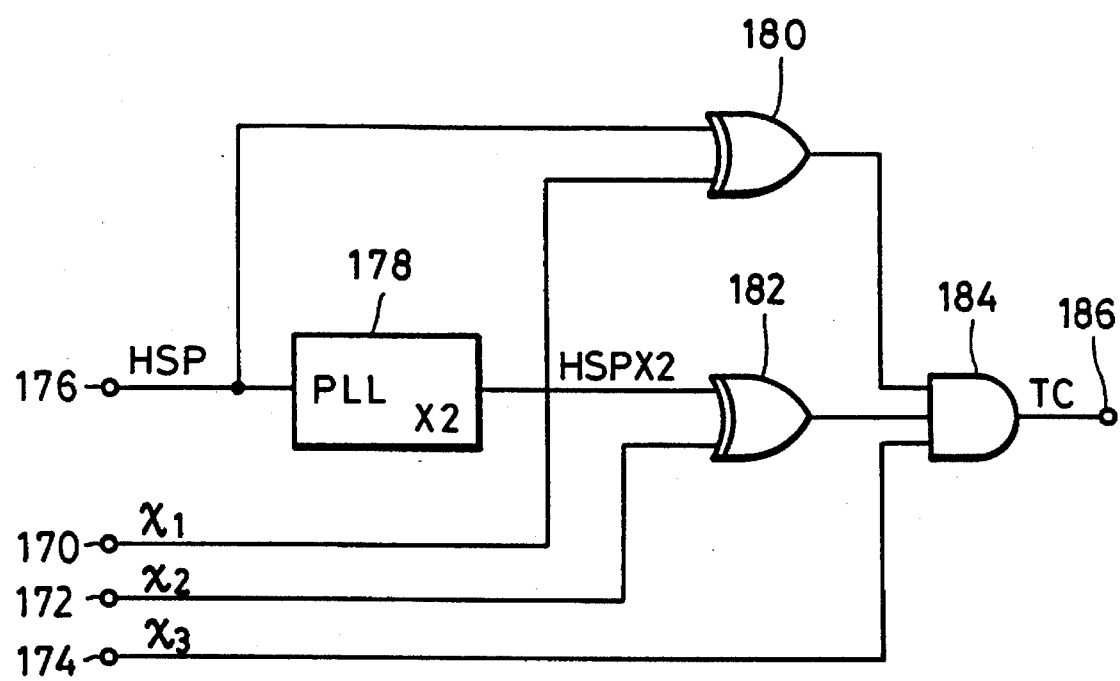
FIG. 13 is a diagram showing an example of a timing control circuit in FIG. 9.

FIG. 13 is a diagram showing an example of the timing control circuit 50 in FIG. 9. In FIG. 13, the data ×1, ×2 and ×3 from the reproduced-track discrimination circuit 48 are input to terminals 170, 172 and 174, respectively, and the HSP is input to a terminal 178. A PLL circuit 178 for doubling the HSP provides an output as indicated by HSP 33 2 in FIG. 13. When the discrimination circuit 48 discriminates that the head H1 is reproducing the track Tr1, since ×3 is "1" (=Hi), and ×1 and ×2 are "0"(=Lo), EXOR's 180 and 182 output the HSP and HSP ×2 as they are, respectively. Hence, a timing signal TC which an AND gate 184 outputs becomes TC1 in FIG. 11. Similarly, when the discrimination circuit 48 discriminates that the head H1 is reproducing the tracks Tr3, Tr5 and Tr7, outputs as TC3, TC5 and TC7 in FIG. 11 are obtained from the AND gate 184. Furthermore, when the head H1 is tracing the tracks Tr2, Tr4, Tr6 and Tr8, since ×3 ="0", the AND gate 184 does not output. This is because, when the head H1 is tracing a track having an even number, a normal reproduction is not performed, and there is no necessity of signal processing.

For example, when the head HI is tracing the Tr7, it becomes that ×1=×2=×3="1", and a signal as indicated by TC7 in FIG. 11 is supplied to the RAM 52 as a timing control signal via a terminal 186. The RAM 52 is configured such that it performs a processing which is completed within a frame sequentially from data from the track Tr1 written in a predetermined address according to the trailing timing of an output of the timing control circuit 50. In this case, an access is performed from a read signal of the address h3 of the RAM 46 which is a reproduced signal of the head H3. Since the head H3 is tracing the track Tr1 at this time, the RAM 52 can perform a processing for data for one frame which is identical to that while recording.

An ECC decoder 54, which corresponds to the ECC encoder 8 in FIG. 3, performs error correction processing, array conversion and the like by accessing the RAM 52, and inputs time-series digital video signals to a time-series processing circuit 56. In the time-series processing circuit 56, there is performed processings which are inverse to those in the time-series processing circuit 4 in FIG. 3. For example, DPCM decoding, interpolation, D/A conversion and the like are performed. A video signal which is thus output from the lime-series processing circuit 56 is output to the outside from a terminal 58.

According to a configuration as described above, a track as a control object of tracking control exists every two tracks, and so a draw-in time into a tracking-control draw-in state becomes extremely short. A period during which time-series video signals cannot be reproduced becomes thereby extremely short, and excellent reproduced video signals can be obtained.

EXAMPLE 2

Figure 14:
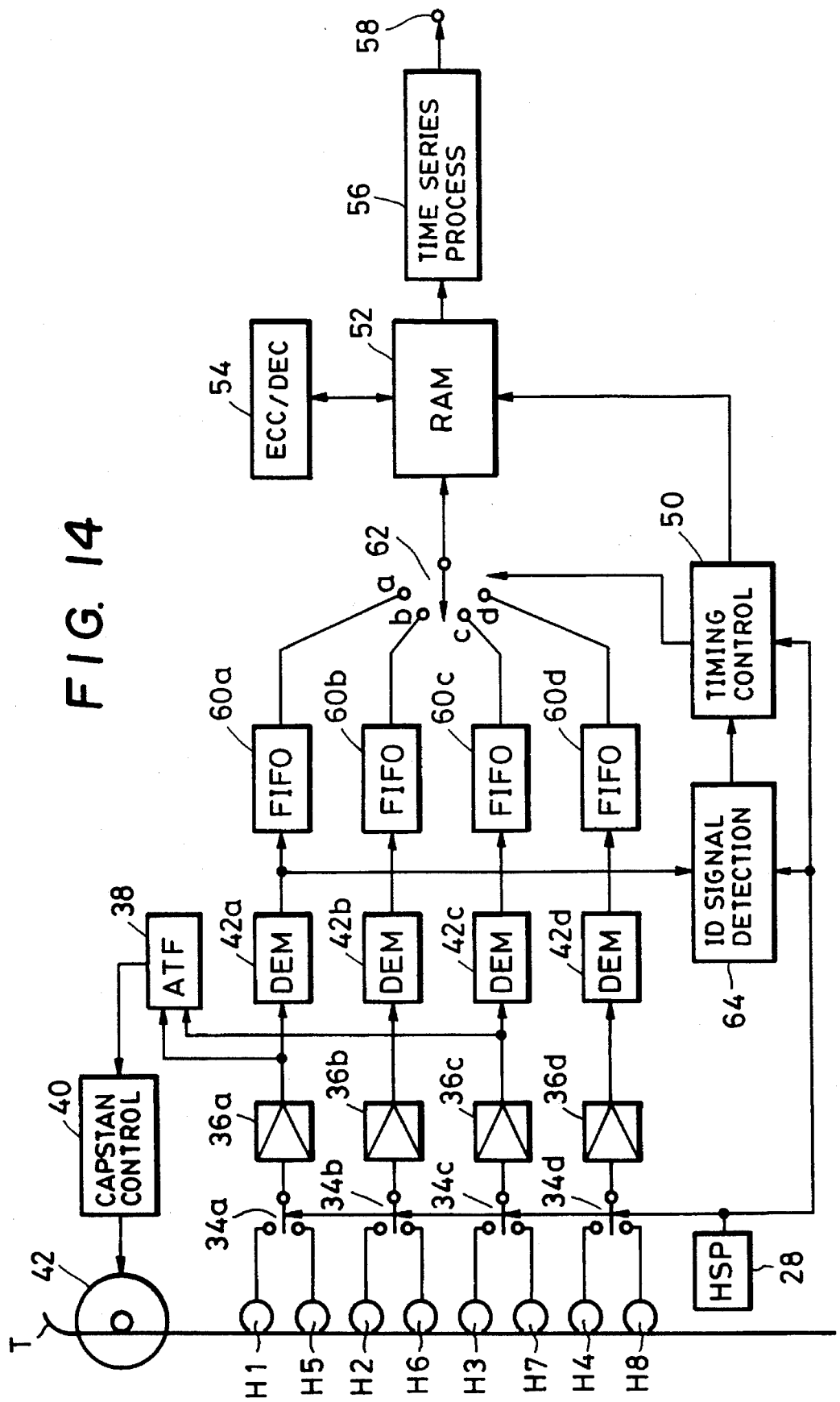
FIG. 14 is a diagram showing a schematic configuration of a reproducing system of a DVTR as a second embodiment of the present invention.

FIG. 14 is a diagram showing a configuration of a reproducing system as a second embodiment of the present invention. As a configuration of a recording system, that which is shown in FIG. 9is assumed. It is to be noted that, in FIG. 14, like components as those in FIG. 9 are indicated by like numerals, and a detailed explanation thereof will be omitted.

First-in first-out memories (FIFO) 60a–60d can store reproduced data of each head for ¼ frame, respectively. When data included in reproduced signals of the heads H1–H4 are simultaneously written into the FIFO's 60a–60d, the FIFO's 60a–60d sequentially read these data for a period of ⅛ frame with the timing that the heads H5–H8 perform reproduction, and also write data included in reproduced signals of the heads H5–H8. At this time, a switch 62 is connected in the order of a→b→c→d for a period of ⅛ Frame, respectively. Data included in reproduced signals of the heads H5–H8 are sequentially read with the timing that the heads H1–H4 performs reproduction. Data which the switch 62 outputs thereby become serial data which are entirely identical to those read by the RAM 46 in the embodiment in FIG. 9.

An ID-signal detection circuit 64 receives sync blocks including ID which are output from a demodulation circuit 42a, and extracts data indicating track numbers within a frame in ID. The ID-signal detection circuit 64 then selects among the data indicating track numbers only data by a reproduced signal of the head H1 in accordance with the HSP, and supplies it to a timing control circuit 50 as three-bit parallel data. The output from the ID-signal detection circuit 64 to the timing control circuit 50 becomes identical to the output of the reproduced-track discrimination circuit 48 in FIG. 9. The function in the timing control circuit 50 is also identical.

According to the above-described second embodiment, in addition to the identical functions and effects as those in the first embodiment, a large-capacity RAM can be reduced. Hence, an inexpensive configuration can be provided. Furthermore, since it can be considered that an ID-signal detection circuit is originally provided for some different purpose, its use for reproduced-track discrimination can simplify the circuit configuration. Moreover, since pilot signals for tracking control are not used for reproduced track discrimination, a recorded pattern of pilot signals can be completely of two-track period, and the $f_1$ can be recorded, for example, on the track Tr7 in the first embodiment. A tracking control having a high accuracy thereby becomes possible without performing recording in accordance with a complicated tracking pattern.

EXAMPLE 3

Figure 15:
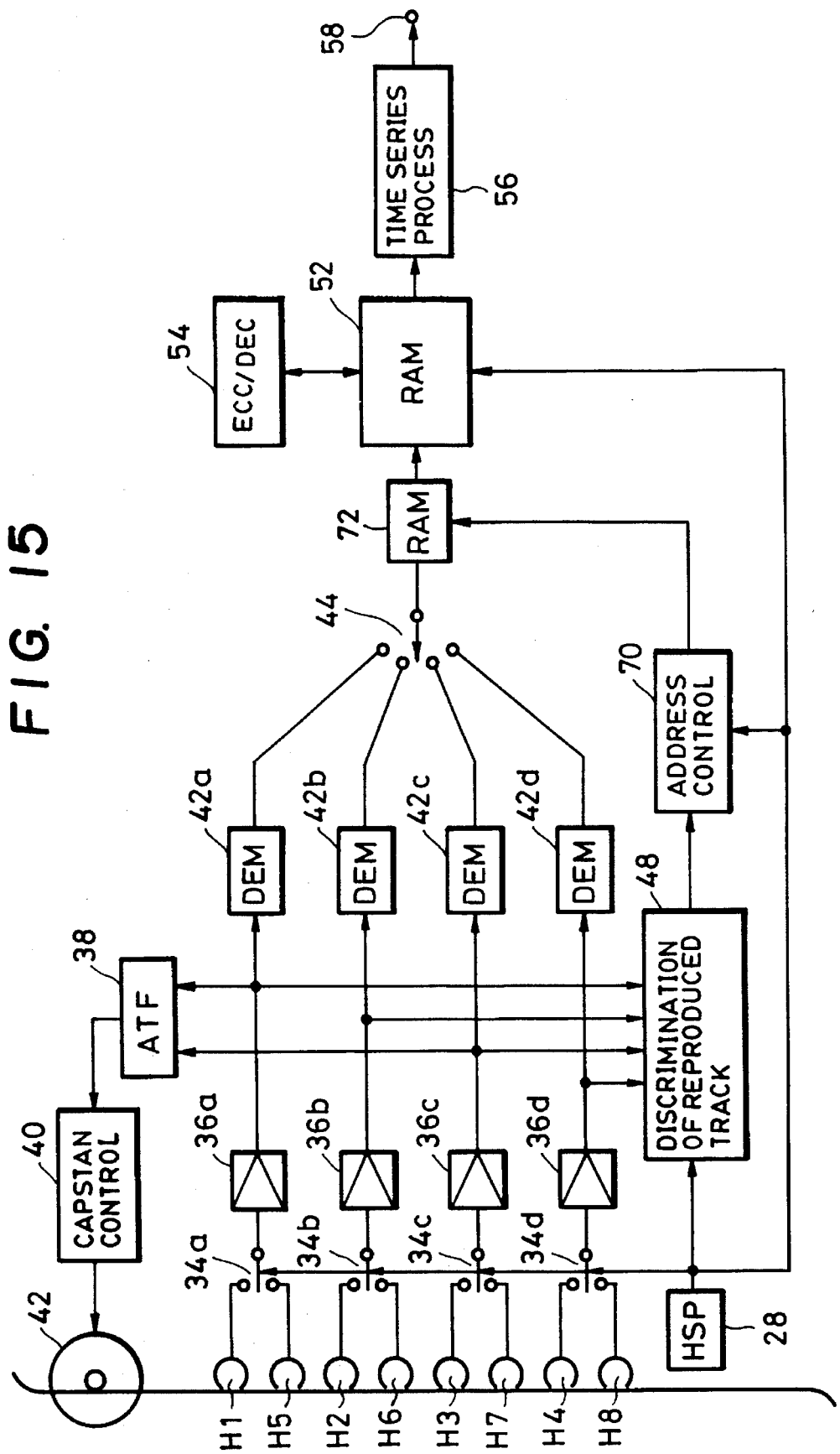
FIG. 15 is a diagram showing a schematic configuration of a reproducing system of a DVTR as a third embodiment of the present invention.

FIG. 15 is a diagram showing a configuration of a reproducing system of a DVTR as a third embodiment of the present invention. As in the case of the second embodiment, a configuration of a recording system is assumed to be that indicated in FIG. 3, and like components as those in FIG. 9 are indicated by like numerals.

Figure 16:
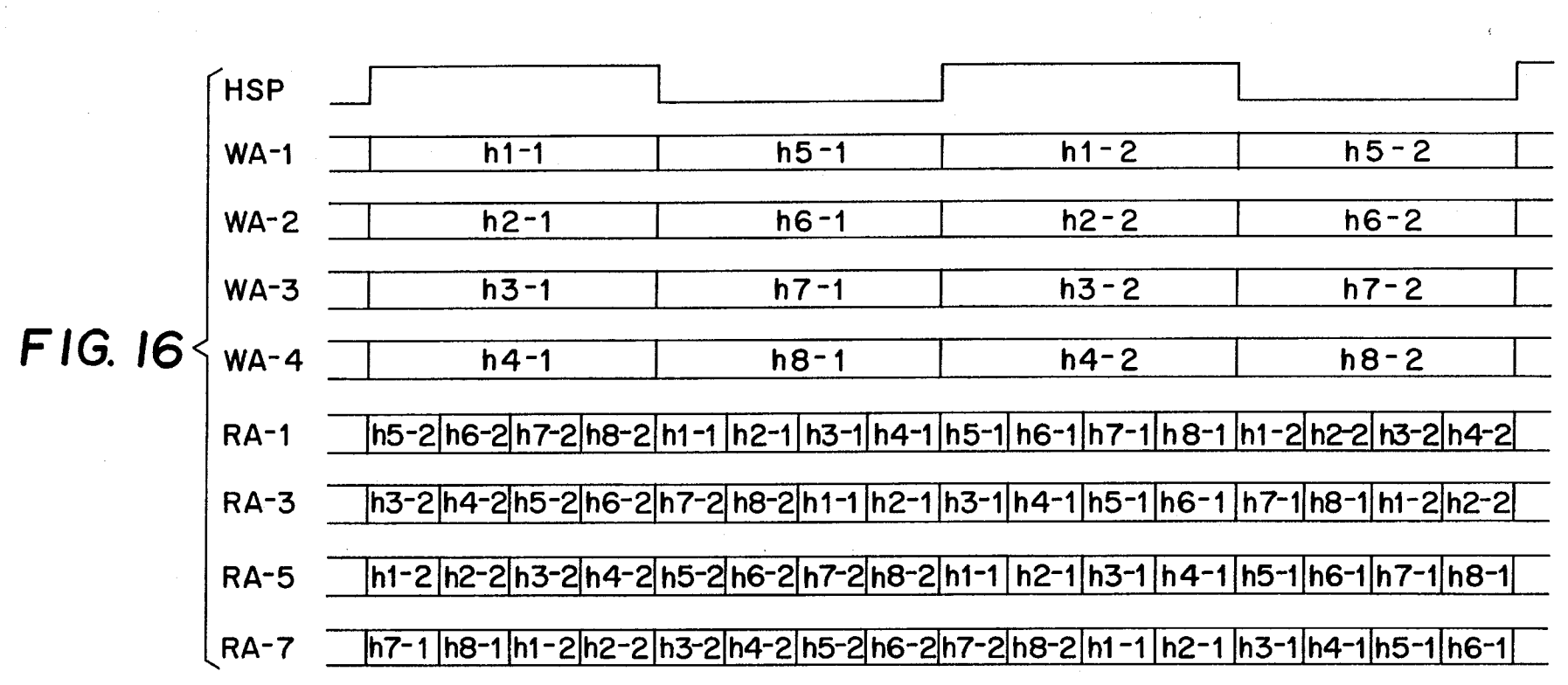

In FIG. 15, a RAM 72 is a memory which can store data for at least 3/2 frames. In the present embodiment, for the purpose of simplification, it is assumed that the RAM 72 can store reproduced data for two frames. An address control circuit 70 controls read addresses of the RAM 72. FIG. 16 is a timing chart for explaining the function of the address control circuit 70.

It is assumed that addresses of the RAM 72 have areas h1—1–h8-1 for storing reproduced data of each of the heads H1–H8 in a first frame, respectively, and areas h1-2–h8-2 for storing reproduced data of each of the heads H1–H8 in a second frame, respectively. At this time, as in the first embodiment, write into the RAM 72 is virtually performed into four channels in parallel, and write addresses of repro-duced signals of each channel are determined in accordance with the HSP as indicated by WA-1–WA-4 in FIG. 16

On the other hand, read addresses are determined by three-bit data which are output from a reproduced-track discrimination circuit 48. That is, when outputs ×1, ×2 and ×3 from the reproduced-track discrimination circuit 48 are "0, 0, 1", that is, it is discriminated that a reproduced track of the head H1 is Tr1, read addresses are set as RA-1 in FIG. 18. Similarly, when it is discriminated that reproduced tracks of the head HI are Tr3, Tr5 and Tr7, read addresses are set as RA-3, RA-5 and RA-7 in FIG. 16.

Data read from the RAM 72 immediately after a trailing edge of the HSP thereby become data which are reproduced from the track Tr1. Accordingly, in the RAM 52, the access timing of a signal processing which is completed in one frame may be always constant on the basis of the HSP. This becomes a processing timing identical to that when the head H1 traces the track Tr1 by tracking control.

In the above-described third embodiment, identical effects as those in the first embodiment can also be obtained. In addition, since signal processing while recording and reproducing is performed always on the basis of the HSP, the third embodiment is convenient when plural apparatuses are operated in synchronization.

EXAMPLE 4

Figure 17A:
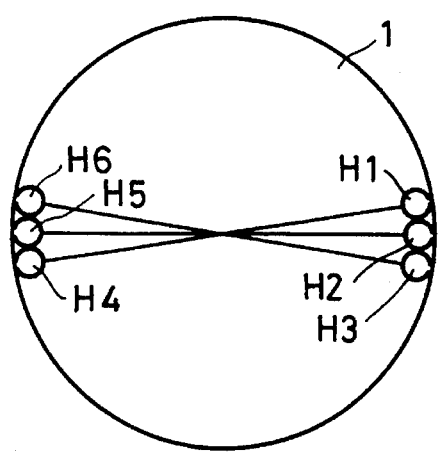
FIGS. 17(A) and 17(B) are diagrams showing a head configuration of a multichannel DDR as a fourth embodiment of the present invention.
Figure 17B:
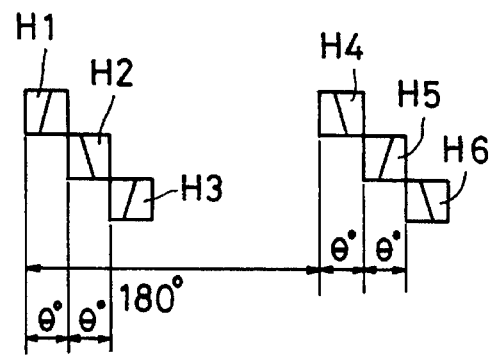

FIGS. 17(A) and 17(B) are diagrams showing a head configuration of a multichannel digital data recorder (DDR) as a fourth embodiment of the present invention. In FIG. 17(A), six rotating heads H1–H6 are disposed on a rotating drum 1. The rotating heads H1–H3, and the rotating heads H4–H6 are disposed so that a phase difference between adjacent heads becomes 0° . 0° is set at a sufficiently small value, and closely-spaced three heads are disposed so that they almost simultaneously trace a tape. The rotating heads H4–H6 rotate with a 180° phase difference relative to the rotating heads H1–H3, and the heads H1–H3 and the heads H4–H6 alternately trace a magnetic tape which are wound around the drum 1 over an angle range of no smaller than 180°, and perform three-channel recording.

As shown in FIG. 17 (B), the heads H1, H3 and H5 have tin identical azimuth angle, and the heads H2, H4 and H6 also lave an identical azimuth angle which is different from that of the heads HI, H3 and H5. A so-called azimuth recording is thereby performed.

Figure 18:
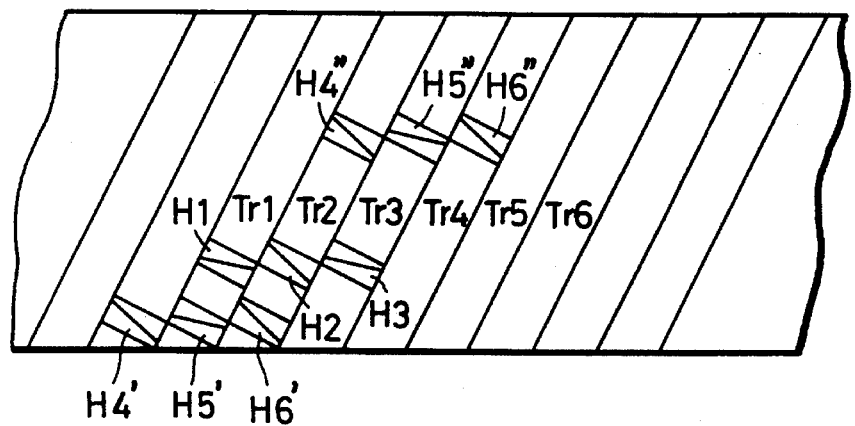
FIG. 18 is a diagram showing a recorded pattern by the head configuration shown in FIGS. 17(A) and 17(B)

FIG. 18 shows a track pattern recorded on a magnetic tape T by the heads shown in FIGS. 17(A) and 17(B). Tracks indicated by Tr1–Tr6 show tracks recorded by the heads H1–H6, respectively. By the tracing of the heads H1–H3 on the tape from the positions indicated by H1–H3 toward an obliquely upward direction in FIG. 18, three-channel recording is performed while forming the tracks Tr1–Tr3.

Figure 19:
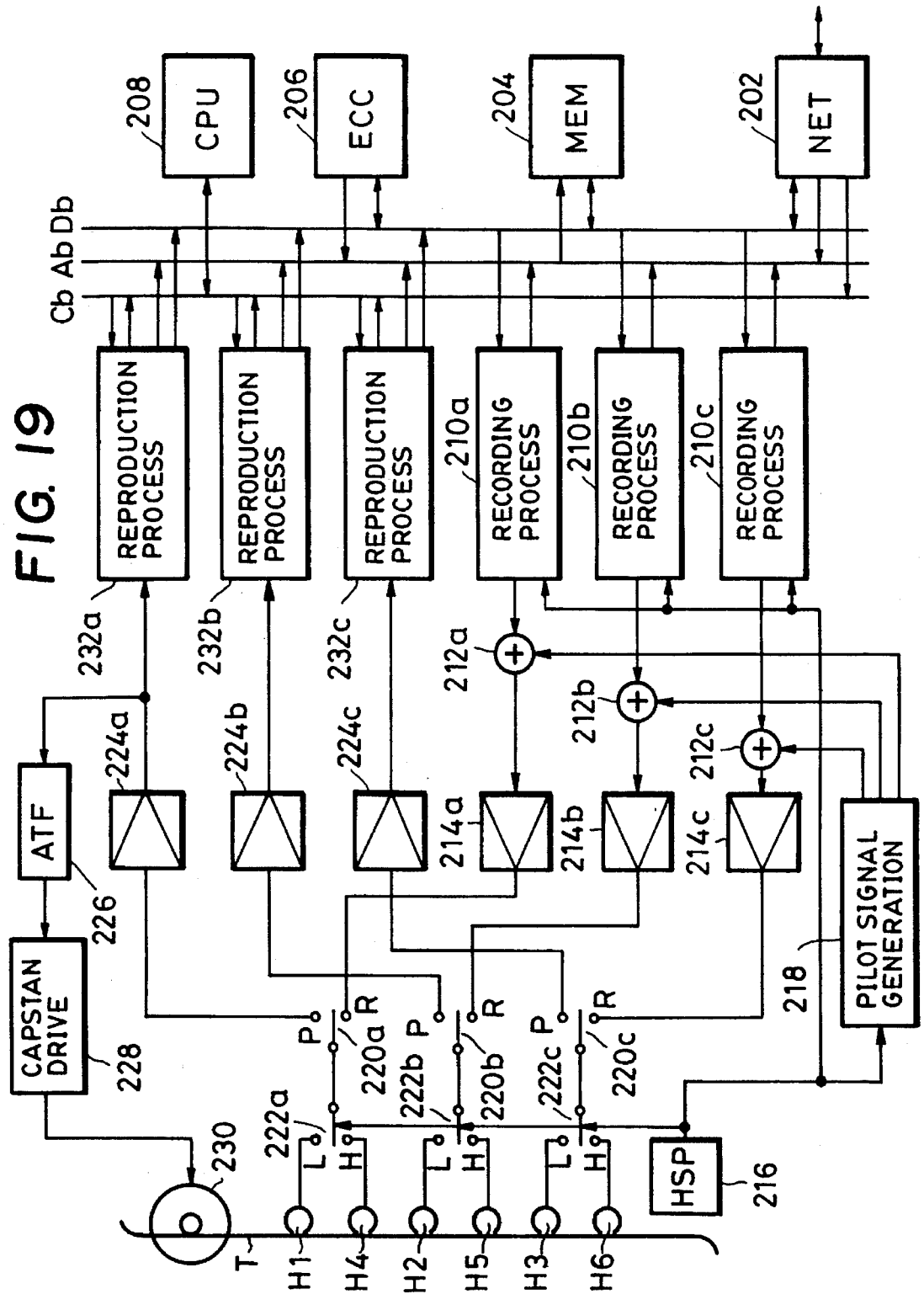
FIG. 19 is a diagram showing a schematic configuration of a DDR as the fourth embodiment of the present invention.

FIG. 19 is a diagram showing a schematic configuration of a DDR as an embodiment of the present invention. In FIG. 19, a network interface (abbreviated hereinafter as NET) 202 delivers and receives data with the outside. There is also shown a large-capacity random access memory (abbreviated hereinafter as MEM) 204, an error correcting coding and decoding circuit (abbreviated hereinafter an ECC circuit) 206 and a central processing unit (CPU) 208.

Data which are input from tile NET 202 are stored into the MEM 204 via a data bus Db, and, after adding an error correcting code (ECC) in the ECC circuit 206, data including ECC is supplied to three recording process circuits 210a, 210b and 210c. At this time, addresses on the MEM 204 which the NET 202, ECC circuit 206 and recording process circuits 210a, 210b and 210c access ape transmitted via an address bus Ab.

Figure 20:
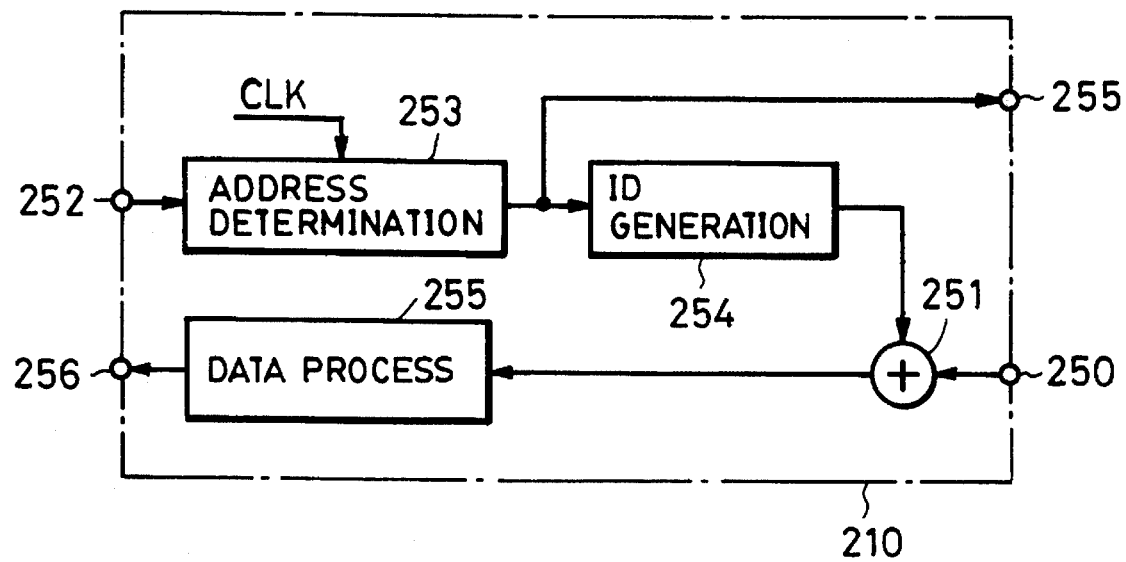
FIG. 20 is a diagram showing an example of a recording process circuit of the DDR shown in FIG. 19.

FIG. 20 shows a concrete example of the recording process circuits 210a, 210b and 210c in FIG. 19. Data including ECC are input from a data bus Db to a terminal 250. The input data are supplied to a synthesizing circuit 251, and synthesized with ID data which will be described later.

The head configuration of the DDR of the present embodiment is that shown in the above-described FIGS. 17(A) and 17(B). In FIG. 19, an HSP generator 216 generates a rectangular head switching pulse (HSP) which falls with the timing that the heads H1, H2 and H3 start tracing the tape T, and rises with the timing that the heads H4, H5 and H6 start tracing the tape T. In FIG. 20, the HSP is input to a terminal 252. An address determination circuit 253 determines an addess in the MEM 204 which the recording process circuit 210 accesses according to a clock signal (CLK) having a frequency corresponding to the data rate, and the HSP. An output of the address determination circuit 253 is sent out from a terminal 255 to the address bus Ab, and instructs data read from each address within the MEM 204. At this time, the three recording process circuits 210a, 210b and 210c, the ECC circuit 206 and the NET 202 access the MEM 204, and these accesses are performed in time series by an arbiter (not illustrated).

Address data which the adess determination circuit 253 outputs are also input to an ID generator 254, which generates additional data (ID data) including data indicating the address data (to be described in detail later) and supplies them to the synthesizing circuit 251.

Principal information data via the NET 202, ECC and data sequence including the ID data are output from the synthesizing circuit 251, and after bring subjected to processings such as digital demodulation and the like in a data process circuit 255, further output from an output terminal 256 as a digital signal which the recording process circuit 210 outputs.

Three-channel digital signals which the recording process circuits 210a, 210b and 210c output are subjected to a time-sharing multiplexing with a pilot signal which a pilot-signal generation circuit 218 generates in mixers 212a, 212b and 212c, respectively.

Figure 21:
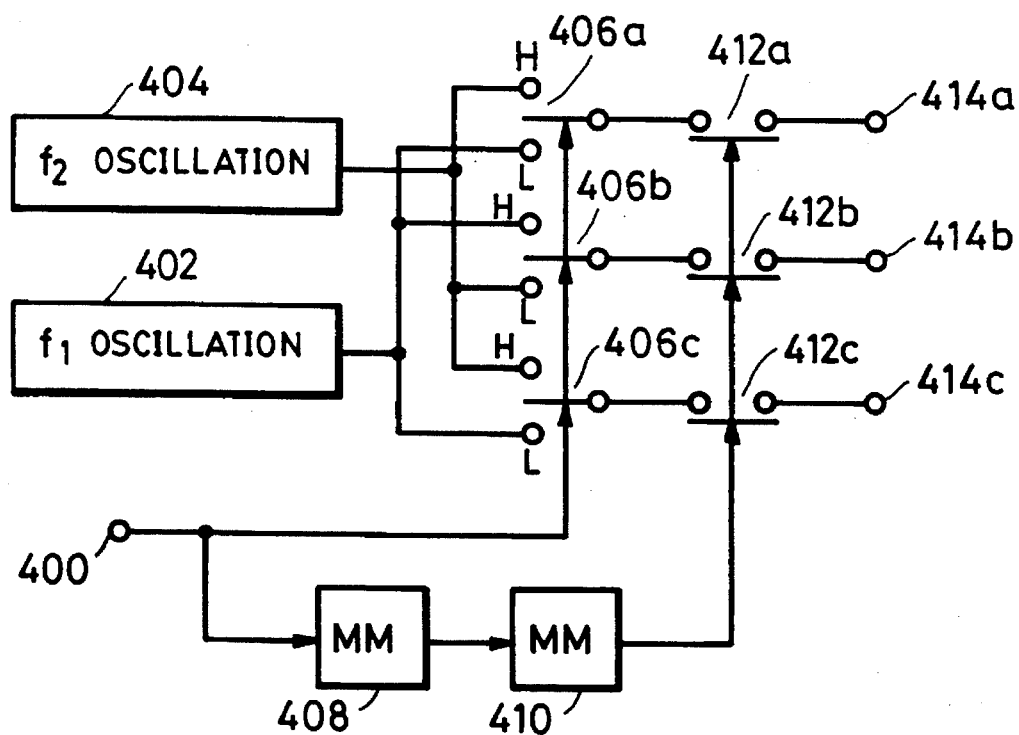
FIG. 21 is a diagram showing a possible configuration of a pilot-signal generation circuit of the DDR shown in FIG. 19.

FIG. 21 is a diagram showing an example of the pilot-signal generation circuit 218.

In FIG. 21, there are shown an input terminal 400 for the HSP, an oscillator 402 for oscillating a signal having a frequency $f_1$ (simply termed hereinafter $f_1$ ), and an oscillator 404 for generating a signal having a frequency $f_2$ (simply termed hereinafter $f_2$). Switches 406a, 406b and 406c are connected to the side H when the HSP is at a high level (Hi), and to the side L when the HSP is at a low level (Lo). Monomultivibrators (MM) 408 and 410 determine gate timings of gates 412a, 412b and 412c. The MM 408 is triggered by leading and trailing edges of the HSP and supplies an output which is kept Hi for a predetermined time to the MM 410. The MM 410 is triggered by a trailing edge of an output of the MM 408 to obtain an output which is kept Hi for a predetermined time. A gate timing is determined by the output of the MM 410. Although, for simplifying the explanation, the heads H1–H3 and the heads H4–H6 have identical rotation phases and turn on the gates 412a, 412b and 412c with identical timings, respectively, gate timings are actually shifted by the amount of a phase difference between the heads H1–H3 so that each head records a pilot signal for tracking in an identical phase.

The $f_1$ and $f_2$ which are gated by the gates 212a, 212b and 212c are supplied to adders 412a, 412b and 412c via terminals 414a, 414b and 414c, and recorded on the tape as shown in FIG. 8. That is, the $f_1$ and $f_2$ are recorded on Tr1, Tr3 and Tr5, and Tr2, Tr4 and Tr6 on an identical portion of each track in FIG. 18, respectively.

Digital signals subjected to a time-sharing multiplexing with a pilot signal are input to head switches 222a, 222b and 222c via recording amplifiers 214a, 214b and 214c, and further via switches 220a, 220b and 220c which are connected to the sides R while recording. The head switches 222a, 222b and 222c are connected to terminals L when the HSP is Lo, and to terminals H when the HSP is Hi, and three-channel digital signals are recorded forming every three tracks by three heads as shown in FIG. 18.

Next, the operation during reproduction will be explained. Outputs from the heads H1–H6 are supplied to reproducing amplifiers 224a, 224b and 224c via sides P of the switches 222a, 222b and 222c and the switches 220a, 220b and 220c, respectively.

An ATF circuit 226 forms a tracking control signal according to an output from the amplifier 224a, which signal is supplied to a capstan driving circuit 228. The capstan driving circuit 228 controls the rotation phase of a capstan 230 in accordance with the tracking control signal so that each of the heads H1–H6 traces a track which is reproducible. In more detail, tracking control is not performed so that the head H1 necessarily traces the track Tr1 as in the prior art, but control is performed so that the head Hi traces either the track Tr1 or the tracks Tr3 and Tr5 which have an identical azimuth angle as that of the track Tr1.

As the ATF circuit 226 in FIG. 19, a circuit which is entirely identical to that shown within the C1 in FIG. 10 can be utilized. Hence, by operating the capstan driving circuit 228 using a tracking-error signal which is output from the ATF circuit 226, the heads H1, H3 and H5 are controlled so that they trace either of the tracks Tr1, Tr3 and Tr5. Since the maximum tracking error at this time is +1 track, a tracking-control draw-in state can be very promptly obtained.

Again in FIG. 19, outputs from the amplifiers 224a, 224b and 224c are supplied to reproduction process circuit 232a, 232b and 232c, respectively. The reproduction process circuit 232a, 232b and 232c write data including ECC into the MEM 204, and an error correction is performed for data in the MEM 204 by the ECC circuit 206. The NET 202 reads only main data from the MEM 204 and outputs them to the outside.

Figures 22, 23:
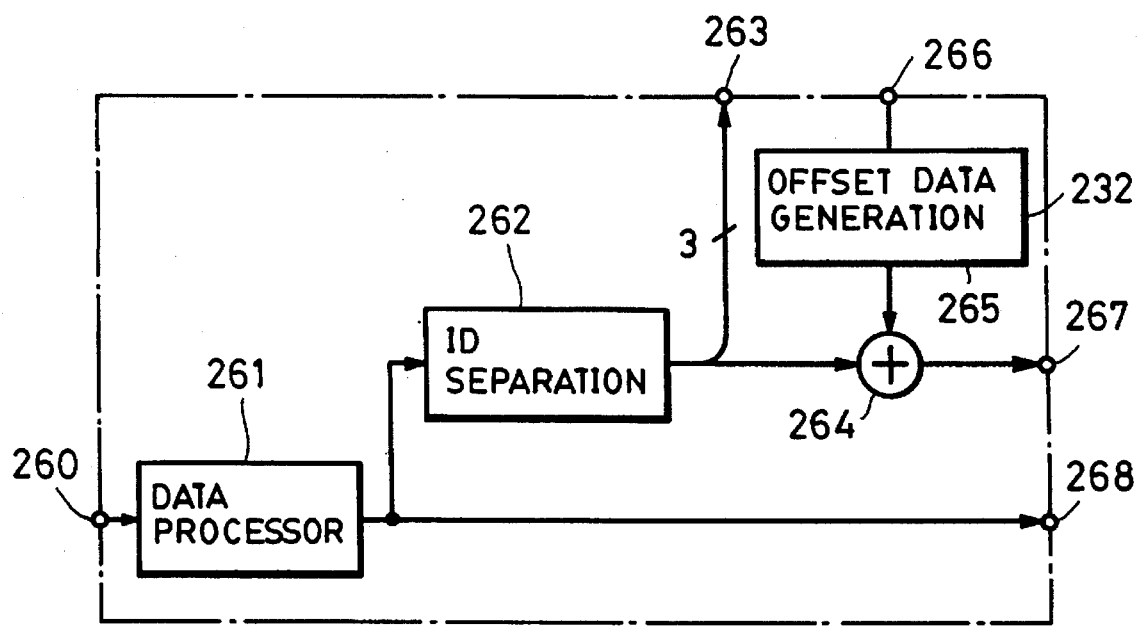
FIG. 22 is a diagram showing a model of storage areas and addresses in a memory of the DDR shown in FIG. 19.
FIG. 23 is a diagram showing a configuration of a reproduction process circuit of the DDR shown in FIG. 19.

A model of data storage areas and their addresses within the MEM 204 are shown in FIG. 22. In FIG. 22, A-1– A-8 are areas allocated for data to be processed in a recording process circuit 210a, that is, data to be recorded on the tracks Tr1 and Tr4 (termed hereinafter A-channel data), and each of the areas A-1, A-2, - - - , A-8 can store data for one track. Similarly, B-1–B-8 are areas allocated for data to be processed in the recording process circuit 210b (B-channel data), and C-1–C-8 are data to be processed in the recording process circuit 210c (C-channel data), and each area can store data for one track.

Address data which the above-described recording process circuits 210a, 210b and 210c send out to the addess bus Ab includes at least the above-described area numbers. In more detail, address data includes significant bits (significant addresses) indicating numbers 1–8 in each area and nonsignificant bits (nonsignificant addresses) indicating addresses within each area. During recording, when the recording process circuit 210a accesses, for example, the area A-1, the recording process circuits 210b and 210c access areas B-1 and C-1, respectively. That is, areas having numbers as the numbers identical to the numbers 1–8 as significant addresses after the channel numbers A–C are simultaneously accessed. Write from the NET 202 into the MEM 204 is also simultaneously performed relative to the areas A-1, B-1 and C-1.

On the other hand, during reproduction, when writing data into the MEM 204, each of the reproduction process circuits 232a, 232b and 232c necessarily writes the data into an area the channel number of which coincides with each other. FIG. 23 shows an example of the reproduction process circuits 232a, 232b and 232c in FIG. 19.

In FIG. 23, a digital signal from a reproducing amplifier is input to a terminal 260. The input signal is restored to original data by a data processor 261 including a digital demodulator. An ID separation circuit 262 separates the above-described ID data, and further restores an address in the MEM 204 which it accessed while recording to output it as address data. The reproduction process circuits 232a, 232b and 232c determine access addresses to the MEM 204 according to the restored address data. If it is assumed that an adder 264 does not exist, data including ECC which the reproduction process circuits 232a, 232b and 232c output from a terminal 268 are written in identical areas as those stored in the MEM 204 while recording in accordance with address data which are output from a terminal 267. The following effects are thereby provided.

As described above, the ATF circuit 226 performs control so that the head H1 traces either of the tracks Tr1, Tr3 and Tr5. When the head H1 is tracing the track Tr1 as indicated by H1 in FIG. 18, the reproduction process circuits 232a, 232b and 232c write data on areas on an identical channel as that while recording, and significant addresses 1–8 which each of the reproduction process circuits 232a, 232b and 232c accesses are identical. However, when the head H1 is tracing the track Tr3, the heads H4, H5 and H6 are tracing respective tracks as indicated by H4', H5' and H6' in FIG. 18, and so when the reproduction process circuit 232a outputs data read from the area C-3 while recording, the reproduction process circuits 232b and 232c output data read from the areas A-4 and B-4 while recording. Hence, data which are simultaneously output from these three reproduction process circuits 232a, 232b and 232c change their channels with respect to one another, and become data which are relatively shifted in the time direction. The situation is identical also when the head Hi is tracing the track Tr5. At This time, the heads H4, H5 and H6 trace positions H4", H5" and H6" in FIG. 18.

However, as described above, by having a configuration in which data are returned to an area in the MEM 204 in which the data have been stored while recording, an arrangement of data which are read from the NET 202 can be identical to an arrangement of data which have been input in the NET 202. That is, the NET 202 sequentially accesses the MEM 204 in accordance with the significant addresses 1–8 with a predetermined timing which is suitable for an outside apparatus, and relative to A-1, B-1 and C-1, data from the MEM 204 may only be necessarily simultaneously (data sequentially in a more concrete description) output to the outside. Furthermore, even when the processing unit of the ECC circuit 206 covers over plural areas, error correction is possible merely by accessing the identical address as that while recording.

Accordingly, as described above, by returning each reproduced data to an area in the MEM 204 in which the data have been stored while recording, relative to tracking control, reproduction becomes possible provided that each head traces a track the azimuth of which coincides with that of the head.

Now, since an access address in the NET 202 is determined by post-stage circuits such as external apparatus and the like, and significant addresses of each channel are only sequentially changed, the following problems may arise.

That is, now suppose that significant addresses which the reproduction process circuits 232a, 232b and 232c access are areas C-1, A-2 and B-2, significant addresses which the NET 202 accesses are A-2, B-2 and C-2, and nonsignificant addresses which the NET 202 accesses precede nonsignificant addresses which the reproduction process circuits 32b and 32c access. In this case, data read from the areas A-2 and B-2 and data read from the area C-2 are shifted in the time direction by a period which is close to one read cycle of the MEM 204. Furthermore, in the DDR of the present embodiment, the ECC circuit 206 also accesses the MEM 204. Hence, after data of anyone of the reproduction process circuits 232a, 232b and 232c or the MEM 204 have been written, the NET 202 must perform accessing after the lapse of processing time of the ECC circuit 206. Otherwise, data in which error correction is not performed or data having an incomplete error corretion are read from the NET 202.

Hence, in the present embodiment, it is arranged that significant addresses which the reproduction process circuits 232a, 232b and 232c access can be shifted. An explanation of this process will be hereinafter provided.

Among address data which the ID separation circuit 262 in FIG. 23 outputs, three-bit data which correspond to the above-described significant addresses 1–8 are sent out to a control bus Cd via a terminal 263. Significant addresses 1–8 of the access address of the NET 202 are also sent out to the control bus Cd. A CPU 208 refers to these data, and gives an instruction for shifting the access address to the reproduction process circuits 232a, 232b and 232c so that the access address of the NET 202 and the access address of the reproduction process circuits 232a, 232b and 232c are not in a relationship which causes problems as described above.

Now, if it is assumed that the processing time of the ECC circuit is a time for three tracks, that is, a data access time for one significant address, there is no problem if a significant address An which the NET 202 accesses is delayed by no smaller than 3 relative to a significant address Aa which the reproduction process circuit 232a accesses. Accordingly, if Aa–An is less than or equal to 2, significant addresses Aa, Ab and Ac of the reproduction process circuits 232a, 232b and 232c may be shifted.

Figure 24:
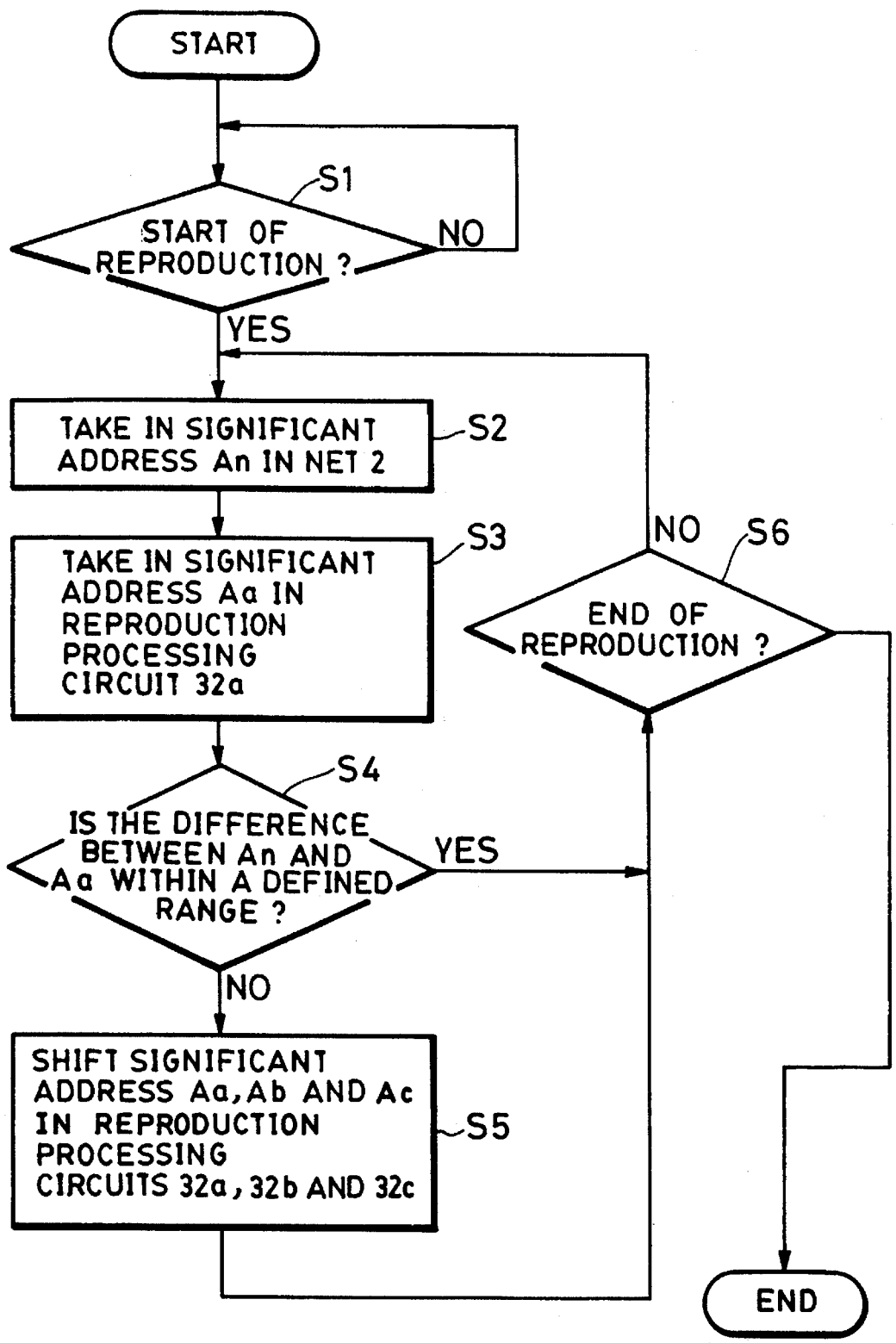
FIG. 24 is a flow chart for explaining a part of operation of a DDR as an embodiment of the present invention.

The operation of the CPU 208 at this time will be explained with reference to a flow chart in FIG. 24. First, when reproduction is started (S1), a significant addess An in the NET 202 is taken in (S2), and a significant address Aa in the reproduction process circuit 232a is further taken in via the terminal 263 (S3). A determination is then made whether or not the difference (Aa–An) between these addresses is no smaller than 3 (S4). If the difference is no smaller than 3, the process returns to S2 via S6. If the difference is less than or equal to 2, an instruction for shifting the offset data is given to an offset-data generation circuit 265 of each of the reproduction process circuits 232a, 232b and 232c via a terminal 266 (S5). The offset-data generation circuit 265 generates, for example, two-bit data, which are added to three-bit significant two bits indicating significant addresses within the address data in an adder 264. If the offset data are shifted one by one, the significant addresses Aa, Ab and Ac of each of the reproduction process circuits 232a, 232b and 232c are shifted by two. The process then returns to S2 via S6, and the same operation is performed. If (Aa–An) is still less than or equal to 2, reproduced Aa, Ab and Ac are shifted by two. S6 is a step for waiting until an end of reproduction.

By providing a configuration as described above, the problems as described above will not arise by timings of data write of the reproduction process circuits 232a, 232b and 232c into the MEM 204, data access of the ECC circuit 206 and data read of the NET 202.

Although it has been assumed that the increment of one shift of the significant addresses Aa, Ab and Ac of each of the above-described reproduction process circuits 232a, 232b and 232c is two, identical effects can also be expected if the increment is one or four. However, if the processing unit of the ECC circuit 206 covers over six tracks (six areas in FIG. 7) including two significant addresses and an address which the ECC circuit accesses is not shifted, error correction is impossible if the shifting unit is one. Hence, the shifting unit of significant addresses in each reproduction process circuit must be two or four. Similarly, when the processing unit of the ECC circuit 206 covers over twelve tracks, the shifting unit of significant addresses of each reproduction process circuit must be four.

In the DDR of the embodiment as described above, since tracking-control target exists every two tracks, a draw-in time of tracking can be extremely short, and it becomes possible to perform an identical reproduction no matter on which control-target track each head is controlled. It is also possible to freely set a data sending-out timing of the NET 2 to the outside in accordance with a need of the outside.

Although, in the above-described embodiment, an explanation was provided with respect to a DDR which performs three-channel simultaneous recording and reproduction, identical effects can also be obtained in general by applying the present invention to a digital-signal reproducing apparatus which performs an n-channel (n being an integer than or equal to 2) simultaneous reproduction.

What is claimed is:

1. An apparatus for reproducing digital information from a recording medium having a plurality of a parallel tracks and digital information recorded thereon as n-channel, n being greater than or equal to 2, digital signals, said apparatus comprising:

n reproducing heads for reproducing the n-channel digital signals;

storage means for storing digital information within the digital signals which said n reproducing heads reproduce;

access means for accessing said storage means in order to perform a predetermined processing of the digital information stored in said storage means;

comparison means for comparing write addresses of said digital information reproduced by said n reproducing heads in said storage means with access addresses to said storage means by said access means; and address shift means for shifting the write addresses of said digital information reproduced by said n reproducing heads in said storage means in accordance with an output of said comparison means, said address shift means shifting the write addresses in said storage means corresponding to one unit of digital information for n tracks.

2. An apparatus according to claim 1, further comprising error correction means for performing an error correction for the digital information stored in said storage means, and wherein said access means comprises an interface for outputting the digital information stored in said storage means to a remote location.

3. An apparatus according to claim 2, wherein said error correction means accesses said storage means corresponding to one unit of digital information for n×j, j being an integer no smaller than 2 tracks, and said address shift means shifts the write addresses in said storage means corresponding to one unit of digital information for n×j tracks.

4. An apparatus for reproducing digital information from a recording medium having a plurality of parallel tracks and digital information recorded thereon as n-channel, n being greater than or equal to 2, digital signals, said apparatus comprising:

n reproducing heads for reproducing the n-channel digital signals;

storage means for storing digital information within the digital signals which said n reproducing heads reproduce;

access means for accessing said storage means in order to perform a predetermined processing of the digital information stored in said storage means;

first designating means for designating an address into which the respective signals reproduced by said n reproducing heads are stored;

second designating means for designating an address to which said access means accesses; and shifting means for shifting the address designated by said first designating means in accordance with the address designated by said second designating means.

5. An apparatus according to claim 4, wherein said shifting means shifts the address designated by said first designating means corresponding to one unit of digital information for n tracks.

* * * * *

UNITED STATES PATENT AND TRADEMARK OFFICE
CERTIFICATE OF CORRECTION

PATENT NO. : 5,481,518
DATED : January 2, 1996
INVENTOR(S) : Motokazu KASHIDA, et al.

It is certified that error appears in the above-indentified patent and that said Letters Patent is hereby corrected as shown below:

ON THE COVER PAGE AT [56] - U.S. PATENT DOCUMENTS:

```
"4,953,866   10/1990   Duncan
 4,956,725   11/1990   Kozuki et al." should read --4,963,866   10/1990   Duncan
  4,956,725    9/1990   Kozuki et al.--.
```

COLUMN 1:

Line 37, "burst," should read --burst--.
    Line 63, "ing, In" should read --ing.  In--.

COLUMN 2:

Line 28, "H?" should read --H7--;
    Line 46, "TP1-Tr8" should read --Tr1-Tr8--;
    Line 50, "HI'-ZH4'" should read --H1'-H4'-- and "HI" " should read --H1"--.

COLUMN 3:

Line 62, "fop" should read --for--.

UNITED STATES PATENT AND TRADEMARK OFFICE
CERTIFICATE OF CORRECTION

PATENT NO.   : 5,481,518
DATED        : January 2, 1996
INVENTOR(S)  : Motokazu KASHIDA, et al.

It is certified that error appears in the above-indentified patent and that said Letters Patent is hereby corrected as shown below:

COLUMN 5:

Line 45, "tile" should read --the--.

COLUMN 6:

Line 22, "inn", should read --in--;
      Line 60, "Liming" should read --timing--.

COLUMN 8:

Line 11, "Hi" should read --H1--;
      Line 39, "]{5" should read --H5--;
      Line 43, "re,produced" should read
--reproduced--.

COLUMN 9:

Line 39, "160a-180d" should read --160a-160d--;
      Line 52, "out-puts" should read --outputs--;
      Line 53, "DT," should read --D7,--;
      Line 65, "TrS." should read --Tr5.--;
      Line 66, "ROM 184" should read --ROM 164--.

UNITED STATES PATENT AND TRADEMARK OFFICE
CERTIFICATE OF CORRECTION

PATENT NO. : 5,481,518
DATED : January 2, 1996
INVENTOR(S) : Motokazu KASHIDA, et al.

It is certified that error appears in the above-indentified patent and that said Letters Patent is hereby corrected as shown below:

COLUMN 10:

Line 3, "188A-188C," should read --166A-166C,--;
Line 5, "188A-188C." should read --168A-168C.--;
Line 7, "168A-188C" should read --168A-168C--
Line 13, "HSP 33" should read --HSP x--;
Line 50, "lime-series" should read --time-series--;
Line 65, "FIG. 9is" should read --FIG. 9 is--.

COLUMN 11:

Line 11, "Frame," should read --frame,--;
Line 13, "performs" should read --perform--.

COLUMN 12:

Line 2, "FIG. 16" should read --FIG. 16.--;
Line 9, "HI" should read --H1--;
Line 33, "0°. 0°" should read --θ°. θ°--;
Line 59, "hereinafter" should read --hereinafter as--.

UNITED STATES PATENT AND TRADEMARK OFFICE
CERTIFICATE OF CORRECTION

PATENT NO. : 5,481,518
DATED : January 2, 1996
INVENTOR(S) : Motokazu KASHIDA, et al.

It is certified that error appears in the above-indentified patent and that said Letters Patent is hereby corrected as shown below:

COLUMN 13:

Line 34, "bring" should read --being--.

COLUMN 15:

Line 3, "as the numbers" should be deleted;
Line 49, "Hi" should read --H1--.

COLUMN 17:

Line 40, "integer" should read --integer greater--.

Signed and Sealed this

Eighteenth Day of June, 1996

BRUCE LEHMAN

Attest:

Attesting Officer

Commissioner of Patents and Trademarks